United States Patent
Takahira et al.

(10) Patent No.: US 6,386,308 B1
(45) Date of Patent: *May 14, 2002

(54) APPARATUS FOR CONTROLLING DRIVE FORCES OF VEHICLE DRIVE WHEELS CONNECTED BY DIFFERENTIAL, BY BRAKING DRIVE WHEEL HAVING SMALLER CRITICAL DRIVE FORCE

(75) Inventors: Yousuke Takahira, Toyota; Hiroto Nishikata, Susono, both of (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,890

(22) Filed: Feb. 2, 1998

(30) Foreign Application Priority Data

Feb. 6, 1997 (JP) ................................ 9-023695

(51) Int. Cl.[7] ............................................ B60K 17/348
(52) U.S. Cl. ...................................... 180/248; 180/197
(58) Field of Search ................................ 180/197, 233, 180/248, 249, 250; 701/70, 82, 83, 89

(56) References Cited

U.S. PATENT DOCUMENTS

| | | | |
|---|---|---|---|
| 4,589,511 A | * | 5/1986 | Leiber ........................ 180/197 |
| 4,685,547 A | | 8/1987 | Ohashi et al. |
| 4,753,312 A | | 6/1988 | Burgdorf et al. |
| 4,763,912 A | | 8/1988 | Matsuda |
| 4,849,892 A | | 7/1989 | Krohn et al. |
| 4,850,656 A | | 7/1989 | Ise et al. |
| 4,981,190 A | * | 1/1991 | Nakayama et al. ......... 180/197 |
| 5,041,978 A | * | 8/1991 | Nakayama et al. ......... 180/197 |
| 5,043,898 A | * | 8/1991 | Yoshino .................... 180/197 |
| 5,107,430 A | | 4/1992 | Magnino |
| 5,199,325 A | * | 4/1993 | Reuter et al. ............... 180/233 |
| 5,737,714 A | | 4/1998 | Matsuno et al. |
| 5,952,939 A | * | 9/1999 | Nakazawa et al. ........... 701/70 |
| 6,026,343 A | * | 2/2000 | Ogino ......................... 701/70 |

FOREIGN PATENT DOCUMENTS

| | | | |
|---|---|---|---|
| AU | B-18401/88 | 1/1989 | |
| DE | 1 174 179 | 7/1964 | |
| DE | 3110017 | * 9/1982 | ................ 180/197 |
| DE | 4002821 | * 8/1990 | ................ 180/197 |
| DE | 36 12 170 C2 | 4/1992 | |
| DE | 36 12 943 C2 | 5/1994 | |
| EP | 457945 | * 11/1999 | ................ 180/197 |
| GB | 2144188 | * 2/1985 | ................ 180/197 |
| JP | A 53-11430 | 2/1978 | |
| JP | A 60-12337 | 1/1985 | |
| JP | 38066 | * 2/1988 | ................ 180/197 |
| JP | B2 3-59848 | 9/1991 | |
| WO | WO 89/01889 | 3/1989 | |
| WO | WO 93/11984 | 6/1993 | |

* cited by examiner

Primary Examiner—Frank Vanaman
(74) Attorney, Agent, or Firm—Oliff & Berridge, PLC

(57) ABSTRACT

An apparatus for controlling a drive force produced between a road surface and each of two drive wheels of a motor vehicle having a differential disposed between the drive wheels and a drive power source and connecting the drive wheels in a differential manner, and two brakes for braking the respective drive wheels, independently of each other, the apparatus including two wheel speed sensors for detecting the speeds of the respective drive wheels, and a brake control device responsive to the outputs of the sensors, for activating one of the two brakes which corresponds to one of the drive wheels which has a smaller critical value of the drive force with respect to the road surface, to thereby apply a braking torque to the one drive wheel for increasing an apparent value of the drive force of that one drive wheel, in order to increase the actual value of the drive force of the other drive wheel which has a larger critical value of the drive force.

9 Claims, 14 Drawing Sheets

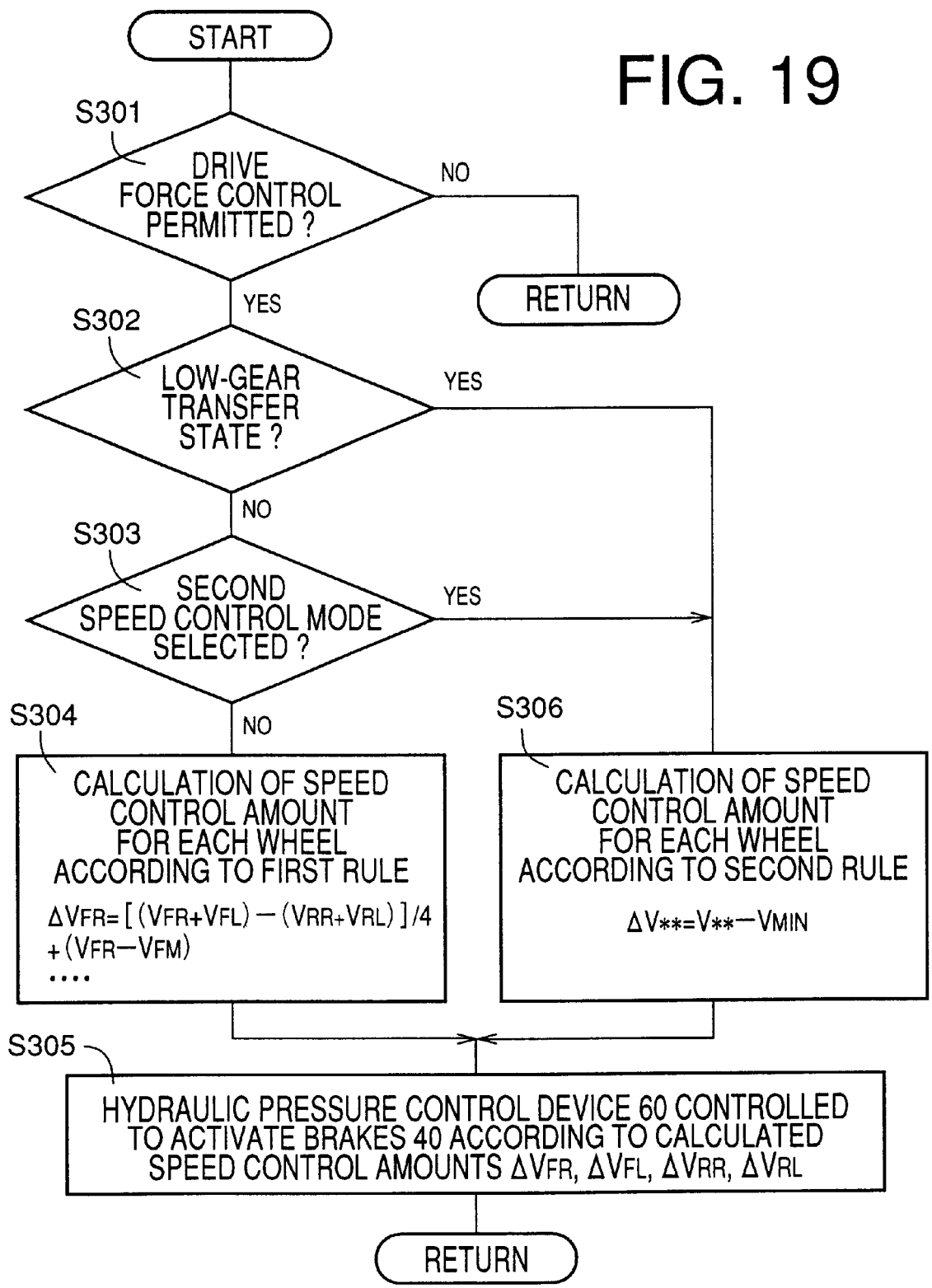

APPARATUS FOR CONTROLLING DRIVE FORCES OF VEHICLE DRIVE WHEELS CONNECTED BY DIFFERENTIAL, BY BRAKING DRIVE WHEEL HAVING SMALLER CRITICAL DRIVE FORCE

BACKGROUND OF THE INVENTION

1. Field of the Invention

The present invention relates in general to an apparatus for controlling an actual drive force to be applied to drive wheels of a motor vehicle, and more particularly to techniques for applying a braking torque to at least one drive wheel to control the actual drive forces of the drive wheels.

2. Discussion of the Related Art

Generally, such a wheel drive force control apparatus is provided for a motor vehicle which includes (a) a drive power source such as an engine and/or an electric motor, (b) at least one pair of drive wheels driven by the drive power source, (c) a differential gear unit disposed between the drive power source and each pair of drive wheels, for connecting the right and left drive wheels of the pair so as to permit the drive wheels to be rotated at different speeds and to equally distribute the driving torque of the drive power source to the drive wheels, so that a drive force is produced between each drive wheel and a road surface, and (d) a pair of brakes for braking the respective drive wheels, independently of each other.

Since the driving torque values distributed to the two drive wheels of each pair from the drive power source through the differential gear unit are always equal to each other, the sum of the actual drive forces of the two drive wheels is two times the actual drive force of the wheel whose critical drive force with respect to the road surface is smaller than that of the other drive wheel. The critical drive force is the maximum drive force that can be produced between the drive wheel and the road surface without slipping of the drive wheel on the road surface, while the differential action of the drive wheels by the differential gear unit is not limited. The critical drive force of each drive wheel depends upon a friction coefficient $\mu$ of the road surface and a vertical load acting on the drive wheel. The critical drive force of one of the two drive wheels of the pair may become smaller than that of the other drive wheel, due to a lower value of the friction coefficient $\mu$ of the road surface area on which the above-indicated one drive wheel is running, and/or a smaller value of the vertical load acting on the above-indicated one drive wheel, than the values of the other drive wheel. In this case, the above-indicated one drive wheel slips on the road surface, and the actual drive force of that drive wheel decreases, so that the driving torque distributed to the other drive wheel by the differential gear unit is reduced. As a result, the actual drive force of the above-indicated other drive wheel decreases, whereby the sum of the actual drive forces of the two drive wheels decreases, making it difficult to achieve smooth starting or acceleration of the vehicle. Namely, in the presence of a difference between the critical drive forces of the two drive wheels, the driving torque to be distributed by the differential gear unit to the drive wheel whose critical drive force is larger cannot be made large enough to assure the actual drive force of that drive wheel that is sufficiently close to its critical drive force, even while the critical drive force of that drive wheel is considerably larger than the actual drive force.

In the light of the above drawback where there exists a difference between the critical drive forces of the right and left drive wheels, the differential gear unit is conventionally provided with an exclusively designed limited slip differential (LSD) mechanism which is adapted to limit the differential action of the differential gear unit, for increasing the actual drive of the drive wheel whose critical drive force is larger, to a value close to the critical value.

However, the provision of such a LSD mechanism in the differential gear unit for each pair of drive wheels inevitably results in a considerable increase in the cost of manufacture and the weight of the differential gear unit.

SUMMARY OF THE INVENTION

It is therefore an object of the present invention to provide an apparatus for controlling actual drive forces to be applied to drive wheels of a motor vehicle, so as to maximize the actual drive forces, by utilizing a brake provided for each drive wheel and without using an exclusively designed limited slip differential mechanism.

The above object may be achieved according to a first aspect of the present invention, which provides an apparatus for controlling an actual value of a drive force produced between a road surface and each of a pair of drive wheels of a motor vehicle including (a) a drive power source for driving the pair of drive wheels, (b) a differential disposed between the drive power source and the pair of drive wheels and connecting the pair of drive wheels so as to permit a difference between rotating speeds of the drive wheels and to evenly distribute a driving torque of the drive power source to the pair of drive wheels, for thereby producing the drive force between the road surface and each drive wheel, and (c) a pair of brakes for braking the pair of drive wheels, respectively, independently of each other, the apparatus being characterized by comprising: a pair of wheel speed sensors for detecting the rotating speeds of the pair of drive wheels; and a brake control device responsive to output signals of the pair of wheel speed sensors, for activating one of the pair of brakes which corresponds to one of the drive wheels which has a smaller critical value of the drive force with respect to the road surface than the other of the drive wheels, to thereby apply a braking torque to the above-indicated one drive wheel for increasing an apparent value of the drive force of that one drive wheel, in order to increase the actual value of the other drive wheel which has a larger critical value of the drive force.

The critical drive force of one of the two drive wheels may become smaller than that of the other drive wheels, due to a lower value of the friction coefficient $\mu$ of the road surface area on which the above-indicated one drive wheel is running, and/or a smaller value of the vertical load acting on the above-indicated one drive wheel, than the values of the other drive wheel. The vertical load may be reduced upon vertical movement or jumping of the drive wheel away from the road surface. If the brake for the above-indicated one drive wheel having the smaller critical drive force value is activated in the above condition, a braking torque is applied to that one drive wheel in the same direction as the actual drive torque based on an actual friction force between the road surface and the drive wheel in question. Namely, the braking torque and the actual drive torque are simultaneously applied to that drive wheel in the same direction. As a result, the apparent value of the drive force of the drive wheel having the smaller critical drive force, as seen from the other drive wheel having the larger critical drive force, is increased, and the slipping of the drive wheel having the smaller drive force is restricted, whereby the speed difference between the two drive wheels is reduced. Accordingly, the drive torque to be applied to the drive wheel having the larger critical drive force is increased by an amount corresponding to the braking torque applied to the drive wheel having the smaller critical drive force, so that the actual drive force of the drive wheel having the larger critical drive force is increased toward the critical value.

The wheel drive force control apparatus according to the first aspect of this invention was developed based on the above finding. In the present apparatus, the brake control device is adapted to activate the appropriate brake for braking the drive wheel having the smaller critical drive force value, when the vehicle is running with the two drive wheels having the different critical drive force values with respect to the road surface. The application of a braking torque to the drive wheel having the smaller critical drive force results in an increase in the apparent value of the drive force of that drive wheel, thereby increasing the actual value of the drive force of the other drive wheel having the larger critical drive force value. Therefore, the brake control device provides substantially the same effect as provided where the apparatus is equipped with a limited slip differential mechanism.

Thus, the present wheel drive force control apparatus is capable of maximizing the actual drive force of each drive wheel, without using an exclusively designed limited slip differential mechanism.

The present first aspect of this invention is applied to a front-drive motor vehicle, a rear-drive motor vehicle, or a four-wheel-drive motor vehicle which will be described. The four-wheel-drive motor vehicle may be a full-time or a part-time four-wheel drive type.

Generally, the four-wheel-drive motor vehicle indicated above includes (a) drive power source for driving the four drive wheels, (b) a front differential connecting the front right and left drive wheels so as to permit these drive wheels to rotate at different speeds, (c) a rear differential connecting the rear right and left drive wheels so as to permit these drive wheels to rotate at different speeds, (d) a center differential connecting input shafts of the front and rear differentials so as to permit these input shafts to rotate at different speeds, and (e) four brakes for braking the respective four drive wheels, independently of each other. The center differential is adapted to distribute a driving torque of the drive power source to the input shafts of the front and rear differentials, and the front differential is adapted to evenly distribute a torque received by the input shaft thereof to the front right and left drive wheels, for thereby producing the drive force between the road surface and each of the front right and left wheels, while the rear differential is adapted to evenly distribute a torque received by the input shaft thereof to the rear right and left drive wheels, for thereby producing the drive force between the road surface and each of the rear right and left drive wheels.

In the four-wheel-drive motor vehicle, slipping of one of the four drive wheels will result in a decrease in the actual drive forces of all of the four drive wheels. To improve the starting and driving performance of the four-wheel-drive motor vehicle on a road surface having a relatively low friction coefficient $\mu$ or on a bad road surface, a differential lock mechanism is conventionally provided for at least one of the three differentials indicated above. Where the differential lock mechanism is provided for the center differential, the slipping of one of the four drive wheels will not cause a decrease in the actual drive forces of all of the four drive wheels. If, however, one of the front right and left drive wheels and one of the rear right and left wheels suffer from slipping, the drive forces of all of the four drive wheels decrease. If the differential lock mechanisms are provided for the center differential and one of the front and rear differentials, the actual drive forces of all of the four drive wheels will not decrease even if one of the front wheels and one of the rear wheels suffer from slipping. However, slipping of the three wheels of the four wheels will cause a decrease of the actual drive forces of all of the four wheels. If the differential lock mechanisms are provided for all of the center, front and rear differentials, the slipping of the three wheels will not cause a decrease in the actual drive forces of all of the four wheels.

Thus, the conventional four-wheel-drive motor vehicle has a limited slip differential mechanism in the form of a differential lock mechanism for at least one of the center, front and rear differentials, in order to improve the starting and driving performance of the vehicle on the low-friction-coefficient or bad road surface. The provision of the limited slip differential mechanism inevitably results in considerable increase in the cost of manufacture and the weight of the vehicle.

It is therefore another object of the present invention to provide an apparatus for controlling actual drive forces to be applied to drive wheels of a four-wheel-drive motor vehicle, so as to maximize the actual drive forces, by utilizing a brake provided for each drive wheel and without using an exclusively designed limited slip differential mechanism.

The above object may be achieved according to a second aspect of this invention, which provides an apparatus for controlling an actual value of a drive force produced between a road surface and each of four drive wheels consisting of a front right drive wheel, a front left drive wheel, a rear right drive wheel and a rear left drive wheel of a four-wheel drive motor vehicle including (a) a drive power source for driving the four drive wheels, (b) a front differential connecting the front right and left drive wheels so as to permit a difference between rotating speeds of the front right and left drive wheels, (c) a rear differential connecting the rear right and left drive wheels so as to a difference between rotating speeds of the rear right and left drive wheels, (d) a center differential connecting input shafts of the front and rear differentials so as to permit a difference between rotating speeds of the input shafts, and (e) four brakes for braking the four drive wheels, respectively, independently of each other, the center differential distributing a driving torque of the drive power source to the input shafts of the front and rear differentials, the front differential evenly distributing a torque received by the input shaft thereof to the front right and left drive wheels, for thereby producing the drive force between the road surface and each of the front right and left drive wheels, the rear differential evenly distributing a torque received by the input shaft thereof to the rear right and left drive wheels, for thereby producing the drive force between the road surface and each of the rear right and left drive wheels, the apparatus being characterized by comprising: four wheel speed sensors for detecting the rotating speeds of the four drive wheels, respectively; and a brake control device responsive to output signals of the four wheel speed sensors, and operable when the four drive wheels have a first and a second drive wheel having different critical values of the drive force with respect to the road surface, the critical value of the drive force of the first drive wheel being smaller than that of the second drive wheel, the brake control device activating one of the four brakes which corresponds to the first drive wheel, to thereby apply a braking torque to the first drive wheel for increasing an apparent value of the drive force of the first drive wheel, in order to increase the actual value of the second drive wheel.

The wheel drive force control apparatus constructed according to the second aspect of the invention described above is also capable of maximizing the actual drive force of each of the four drive wheels, without having to use a limited slip differential mechanism, for the same reasons as described above with respect to the first aspect of the invention.

In the present apparatus, the center differential may be arranged to either evenly or unevenly distribute the input drive torque to the front and rear differentials. Where the center differential is arranged for uneven distribution of the input drive torque to the front and rear differentials, the distribution ratio may be either fixed or variable.

According to a first preferred form of the apparatus of the second aspect of this invention, the brake control device includes control means operable when the four drive wheels includes a lowest-speed drive wheel whose rotating speed is the lowest of all of the four drive wheels. The control means is adapted to control three brakes of the four brakes which three brakes correspond to respective three drive wheels that are the four drive wheels except the lowest-speed drive wheel. The control means controls the three brakes, by using the lowest rotating speed of the lowest-speed drive wheel as a reference wheel speed, so as to substantially zero a difference of the rotating speed of each of the three drive wheels from the reference wheel speed.

In the above first preferred form of the apparatus, the lowest rotating speed of the lowest-speed drive wheel is used as the reference wheel speed for controlling the brakes for the other three drive wheels, such that the rotating speeds of these three drive wheels are controlled to approach the reference wheel speed. Accordingly, the difference of the rotating speeds of the front right and left wheels connected to each other by the front differential is reduced toward zero, and the difference of the rotating speeds of the rear right and left wheels connected to each other by the rear differential is also reduced toward zero. Further, the difference of the rotating speeds of the output shafts of the center differential (input shafts of the front and rear differentials) is also reduced toward zero. Thus, the present form of the apparatus provides substantially the same effect as provided by the limited slip differential mechanisms for all of the center, front and rear differentials.

Accordingly, the wheel drive force control apparatus according to the first preferred form of the second aspect of this invention assures improved starting and driving performance of the four-wheel-drive motor vehicle.

The wheel drive force control apparatus according to the first preferred form, which is arranged to improve the starting and driving performance of the motor vehicle as described above, does not permit the four drive wheels to rotate at different speeds, and therefore tends to suffer from a so-called "tight corner braking phenomenon" during turning of the vehicle. Further, this apparatus does not permit the vehicle operator to recognize a slipping or spinning action of a given drive wheel or wheels which may occur due to jumping thereof away from the road surface (e.g., bumpy road surface). In other words, the apparatus does not permit the vehicle operator to obtain sufficient information on the road surface condition.

It is therefore an optional object of the invention to permit some degree of difference of the rotating speeds of the four drive wheels, for thereby preventing the tight corner braking phenomenon and enabling the vehicle operator to obtain sufficient information on the road surface condition.

The above optional object may be achieved according to a second preferred form of the second aspect of this invention, wherein the brake control device includes control means for calculating a total speed control error for each of the front right and left drive wheels, and a total speed control error for each of the rear right and left drive wheels. The total speed control error for each front drive wheel consists of a first error component which is a difference obtained by subtracting a half of an average speed of the rear right and left drive wheels from a half of an average speed of the front right and left drive wheels, and a second error component which is a difference obtained by subtracting the average speed of the front right and left drive wheels from the speed of each front drive wheel. The total speed control error for each rear drive wheel consists of a first error component which is a difference obtained by subtracting a half of an average speed of the front right and left drive wheels from a half of an average speed of the rear right and left drive wheels, and a second error component which is a difference obtained by subtracting the average speed of the rear right and left drive wheels from the speed of each rear drive wheel. The control means is adapted to control each of the four brakes which corresponds to each of the four drive wheels whose total speed control error is a positive value, such that the positive total speed control error of each drive wheel is substantially zeroed.

In the wheel drive force control apparatus according to the second preferred form of the invention described above, the total speed control error for each of the front right and left drive wheels is obtained as the sum of the first error component and the second error component, as the control amounts suitable for controlling the front wheel brakes, so as to zero the speed difference of the center differential and the speed difference of the front differential. The first error component is obtained by subtracting a half of the average speed of the rear right and left wheels from a half of the average speed of the front right and left drive wheels, while the second error component is obtained by subtracting the average speed of the front drive wheels from the speed of each front drive wheel. On the other hand, the total speed control error for each of the rear right and left drive wheels is obtained as the sum of the first error component and the second error components, as the control amounts suitable for controlling the rear wheel brakes, so as to zero the speed difference of the center differential and the speed difference of the rear differential. The first error component for the rear drive wheels is obtained by subtracting a half of the average speed of the front drive wheels from a half of the average speed of the rear drive wheels, while the second error component for the rear drive wheels is obtained by subtracting the average speed of the rear drive wheels from the speed of each rear drive wheel. However, the rotating speeds of the drive wheels can be controlled by the brakes only where the total speed control error is a positive value. That is, the brakes can be used only when the speeds of the drive wheels are lowered, and cannot be used to raise the speeds of the drive wheels. Thus, the present form of the invention permits some degrees of difference between the speeds of the front and rear wheels, difference between the speeds of the front right and left wheels, and difference between the speeds of the rear right and left wheels. In other words, the four drive wheels are permitted to some extent to rotate at speeds different from each other.

Therefore, the apparatus according to the second preferred form of the invention described above prevents the tight corner braking phenomenon and enables the vehicle operator to obtain sufficient information on the road surface condition.

While the apparatus according to the first preferred form of the invention provides substantially the same effect as provided when the limited slip differential mechanisms are provided for the center, front and rear differentials, as described above, the apparatus according to the second preferred form provides substantially the same effect as provided when the limited slip differential mechanism is provided for only the center differential, but this effect is smaller than that provided when the limited slip differential mechanisms are provided for all of the three differentials.

According to a third preferred form of the second aspect of this invention, the brake control device includes control means for controlling two brakes of the four brakes which correspond to one of a first pair of wheel consisting of the front right and left wheels and a second pair of wheels consisting of the rear right and left drive wheels. The above-indicated one of the first and second pairs has a higher average speed than the other of the first and second pairs. In this case, the control means controls the two brakes, such that the average speed of the one of the first and second pairs is reduced toward the average speed of the other of the first and second pairs.

The wheel drive force control apparatus according to the third preferred form of the invention described above is adapted to control the brakes, by taking into account the speed difference between the front and rear drive wheels, namely, the speed difference of the center differential, but not taking into account the speed difference between the right and left drive wheels.

This third preferred form of the invention provides substantially the same effect as provided when the limited slip differential mechanism is provided for only the center differential.

According to a fourth preferred form of the second aspect of the invention, the brake control device includes at least two control means selected from the control means according to the first preferred form, the control means according to the second preferred form and the control means according to the third preferred form. In this case, the brake control device further includes selectively enabling means for selectively enabling one of the at least two control means to operate.

The wheeld drive force control apparatus according to the fourth preferred form described above provides an increased degree of freedom in controlling the brakes so as to control the drive forces of the drive wheels, than the apparatus according to the first, second or third preferred form, which includes only one of the three control means described above.

The selectively enabling means may include determining means for determining whether the motor vehicle is placed in a condition in which starting of the motor vehicle is difficult, and selecting means for selecting the control means according to the first preferred form if the determining means determines that the motor vehicle is placed in the above-indicated condition, and selecting one of the control means according to the second and third preferred forms if the determining means determines that the motor vehicle is not placed in the above-indicated condition. In this case, the selectively enabling means may include means for determining whether the rotating speed of any one of the four drive wheels is substantially zero, and determining means for determining whether an average rotating speed of the front right and left drive wheels is substantially equal to an average rotating speed of the rear right and left drive wheels. The determining means determines that the motor vehicle is placed in the above-indicated condition if the rotating speed of any one of the four drive wheels is substantially zero and if the average rotating speeds of the front right and left drive wheels and the rear right and left drive wheels are substantially equal to each other.

Alternatively, the selectively enabling means may include determining means for determining whether any one of at least one operator-controlled member is placed in a position for selecting the control means according to the first preferred form, and means for enabling the control means according to the first preferred form if the determining means determines that any one of the above-indicated at least one operator-controlled member is placed in said position.

BRIEF DESCRIPTION OF THE DRAWINGS

The above and optional objects, features, advantages and technical and industrial significance of this invention will be better understood by reading the following detailed description of presently preferred embodiments or modes of the invention, when considered in connection with the accompanying drawings in which:

FIG. 19 is a flow chart illustrating a wheel drive force control routine executed according to a program stored in the read-only memory of the apparatus of the fourth embodiment of FIG. 18.

DETAILED DESCRIPTION OF THE PREFERRED EMBODIMENTS

Figure 1:
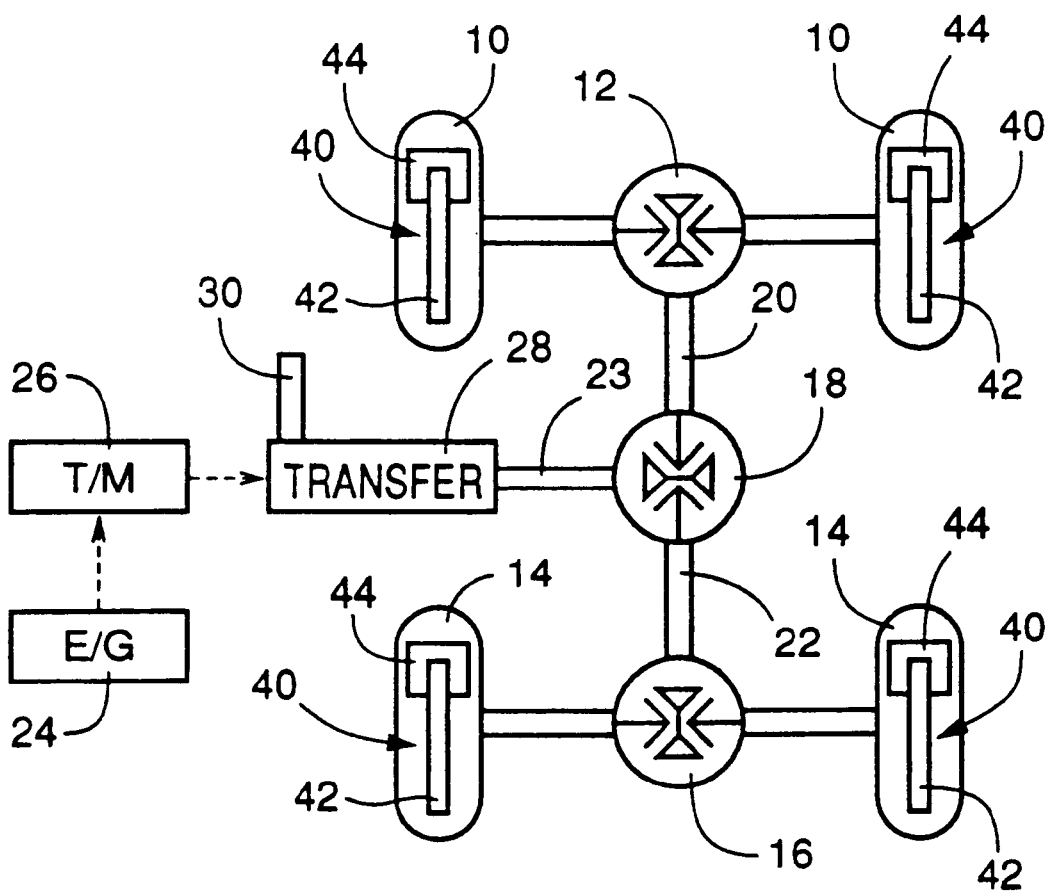
FIG. 1 is a plan view schematically showing a drive system of a four-wheel-drive motor vehicle equipped with a wheel drive force control apparatus constructed according to one embodiment of this invention.

Referring first to FIG. 1, there is schematically shown a drive system of a four-wheel-drive motor vehicle equipped with a wheel drive force control apparatus constructed according to a first embodiment of this invention. The motor vehicle has a pair of front wheels, namely, right and left front wheels 10 which are connected to each other by a front differential gear unit 12 (hereinafter referred to as "front differential 12"), and a pair of rear wheels, namely, right and left rear wheels 14 which are connected to each other by a rear differential gear unit 16 (hereinafter referred to as rear differential 16"). These front and rear differentials 12, 16 are connected to each other by a center differential gear unit 18 (hereinafter referred to as "center differential 18"). The center differential 18 has a front output shaft 20 and a rear output shaft 22, which serve as an input shaft of the front differential 12, and an input shaft of the rear differential 16, respectively.

The center differential 18 has an input shaft 23 which receives a torque from a drive power source in the form of an engine (E/G) 24 through a transmission (T/M) 26 and a transfer 28 in the order of description. The torque received by the input shaft 23 is equally distributed by the center differential 18 to the front and rear differentials 12, 16. The transfer 28 has a HIGH-GEAR TRANSFER state and a LOW-GEAR TRANSFER state in which the torque of the engine 24 is transmitted to the center differential 18, with a, high-gear ratio and a low-gear ratio. The transfer 28 is selectively placed in the HIGH-GEAR or LOW-GEAR TRANSFER state, by an operation of an operator-controlled transfer switching member 30.

Each wheel 10, 14 of the motor vehicle is provided with a hydraulically operated disc brake 40, which includes a disc rotor 42 rotating with the wheel 10, 14, and a hydraulic actuator 44 which includes a pair of friction pads and a wheel brake cylinder 56 hydraulically operated to force the friction pads onto the opposite surfaces of the disc rotor 42, to thereby brake the wheel 10, 14.

Figure 2:
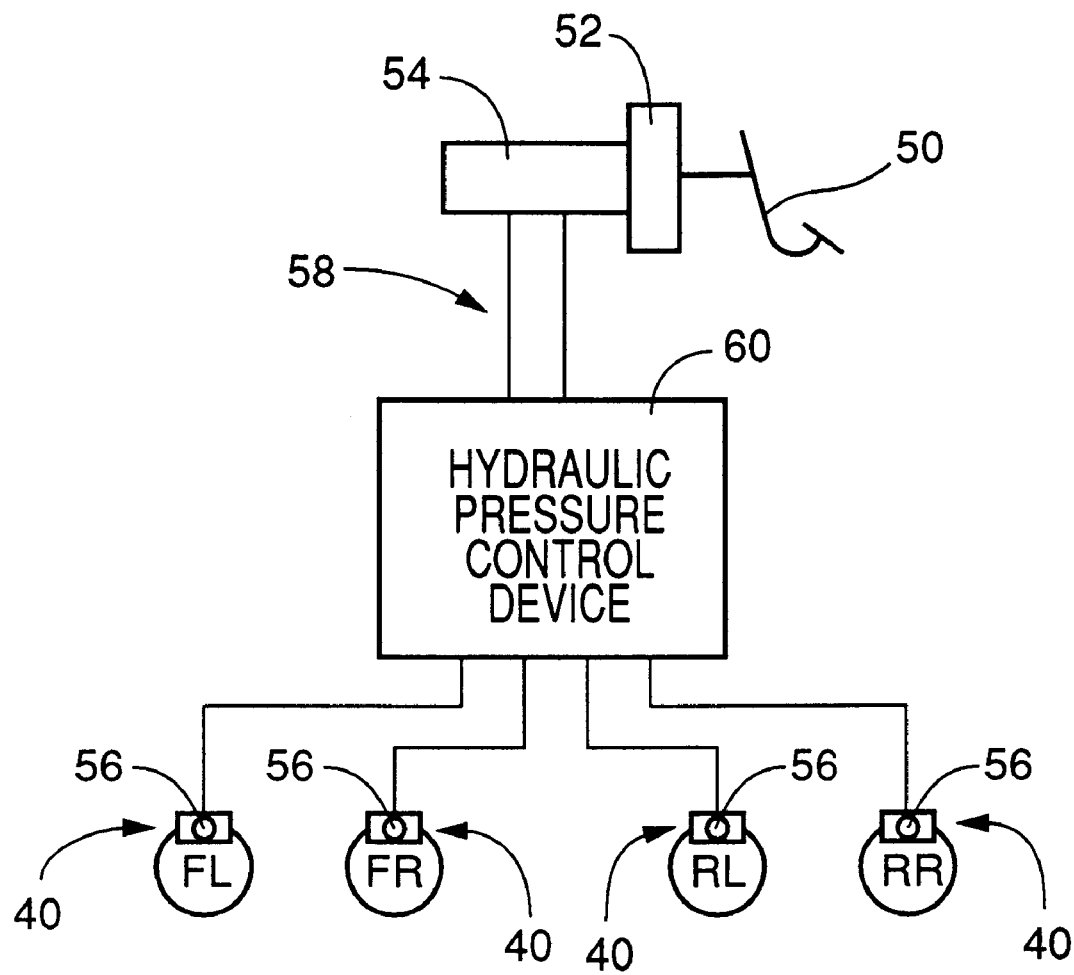
FIG. 2 is a view illustrating a braking system in the four-wheel drive motor vehicle of FIG. 1.

That is, the motor vehicle has a braking system as shown in FIG. 2, which includes the four brakes 40 for the respective four drive wheels 10, 14. The braking system further includes an operator-controlled brake operating member in the form of a brake pedal 50, a master cylinder 54 operatively connected to the brake pedal 50 through a brake booster 52. The master cylinder 54 is of a tandem type having two mutually independent pressurizing chambers disposed in series. Hydraulic pressure is mechanically generated in the two pressurizing chambers of the master cylinder 54 such that the generated hydraulic pressure changes with an operating-force acting on the brake pedal 50. One of the two pressurizing chambers of the master cylinder 54 is connected to the brake cylinders 56 of the brakes 40 for the front drive wheels 10 through a fluid passage 58, while the other pressurizing chamber is connected to the brake cylinders 56 of the brakes 40 for the rear drive wheels 14 through another fluid passage 58. A hydraulic pressure control device 60 is connected to the fluid passages 58, for controlling the hydraulic pressures to be applied to the individual brakes 40.

The hydraulic pressure control device 60 has a plurality of operating states including a pressure-increase state for fluid communication between the master cylinder 54 and the wheel brake cylinder 56, and a pressure-decrease state for fluid communication between the wheel brake cylinder 56 and a reservoir (not shown). In the present embodiment, the hydraulic pressure control device 60 has three operating states consisting of the pressure-increase and pressure-decrease states indicated above, and a pressure-hold state in which the wheel brake cylinder 56 is disconnected from both the master cylinder 54 and the reservoir. These three operating states are selectively established by solenoid-operated valves when the hydraulic pressure control device 60 is placed in a drive force control mode. Normally, the control device 60 is placed in the pressure-increase mode in which the hydraulic braking pressure applied to each wheel brake cylinder 56 is controlled according to the operating force acting on the brake pedal 50.

The hydraulic pressure control device 60 may use a three-position valve having the pressure-increase, pressure-decrease and pressure-hold states, for the brake cylinder 56 for each of the four drive wheels 10, 14. Alternatively, the control device 60 may use a two-position valve having the pressure-increase and pressure-hold states, and another two-position valve having the pressure-decrease and pressure-hold states, for each drive wheel 10, 14. The control device 60 may be adapted such that the brake cylinder 56 for each drive wheel 10, 14 is connected to a pressure control chamber which is partially defined by a control piston that is fluid-tightly and slidably received in a bore formed in a housing. In this case, the control piston is driven by a suitable actuator adapted to convert an electric energy into a mechanical energy. The actuator may be an electric motor or a piezoelectric element, for example. The hydraulic pressure in each wheel brake cylinder 56 can be controlled by positioning the control piston.

Figure 3:
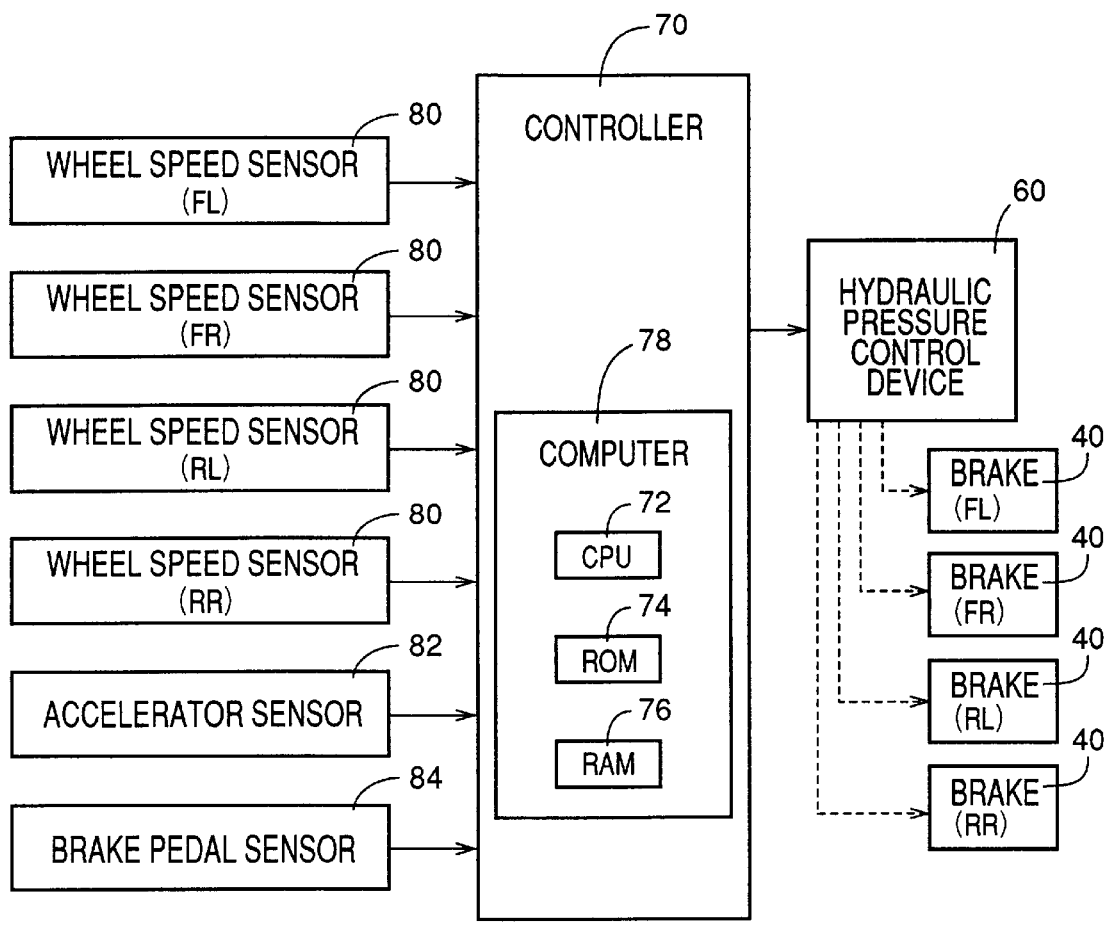
FIG. 3 is a block diagram showing an electrical arrangement of the wheel drive force control apparatus.

Referring next to the block diagram of FIG. 3, there is illustrated an electrical arrangement of the present wheel drive force control apparatus, which has a controller 70 principally constituted by a computer 78 which incorporates a central processing unit (CPU) 72, a read-only memory (ROM) 74 and a random-access memory (RAM) 76. To the input of the controller 70, there are connected four wheel speed sensors 80, an accelerator sensor 82 and a brake pedal sensor 84. The wheel speed sensors 80 are adapted to detect rotating speeds of the respective drive wheels 10, 14. The accelerator sensor 82 is adapted to detect an operation of an accelerator pedal or other vehicle accelerating member by the operator of the vehicle. The brake pedal sensor 84 is adapted to detect an operation of the brake pedal 50 by the vehicle operator. To the output of the controller 70, there is connected the above-indicated hydraulic pressure control device 60. The ROM 74 stores various control programs, and the CPU 72 operates according to these control programs while utilizing a temporary data storage function of the RAM 76, to electrically control the hydraulic pressure control device 60 for thereby controlling the drive forces of the drive wheels 10, 14.

Figure 4:
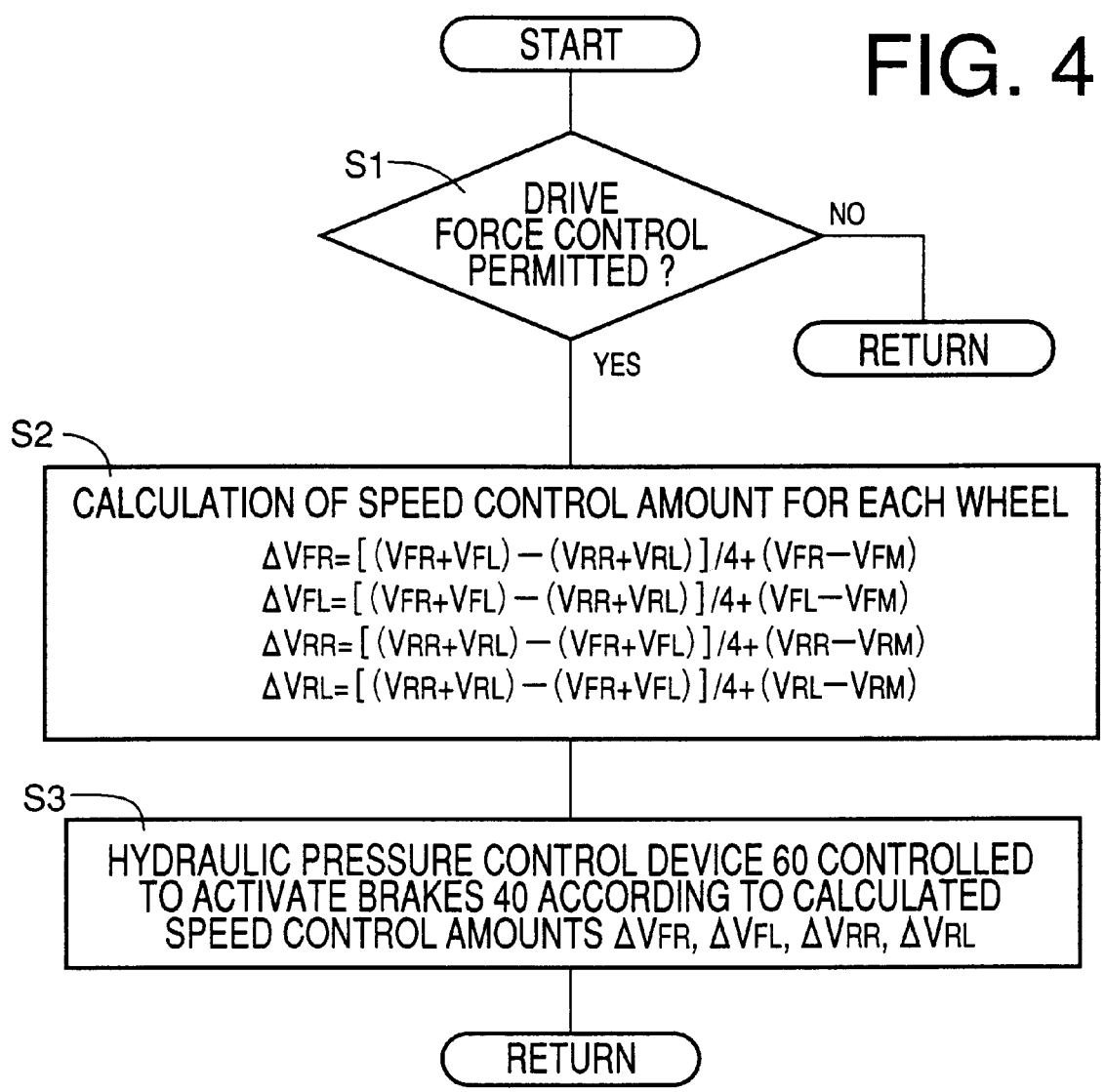
FIG. 4 is a flow chart illustrating a wheel drive force control routine executed according to a program stored in a read-only memory of the wheel drive force control apparatus.

The ROM 74 of the controller 70 stores a control program for executing a wheel drive force control routine as illustrated in the flow chart of FIG. 4. To begin with, the concept underlying this wheel drive force control routine will be explained.

The wheel drive force control routine of FIG. 4 is formulated to minimize a difference between the speeds of the front and rear output shafts 20, 22 of the center differential 18, a difference between the speeds of the output shafts of the front differential 12 (a difference between the speeds of the front right and left wheels 10), and a difference between the speeds of the output shafts of the rear differential 16 (a difference between the speeds of the rear right and left wheels 14).

Figure 5:
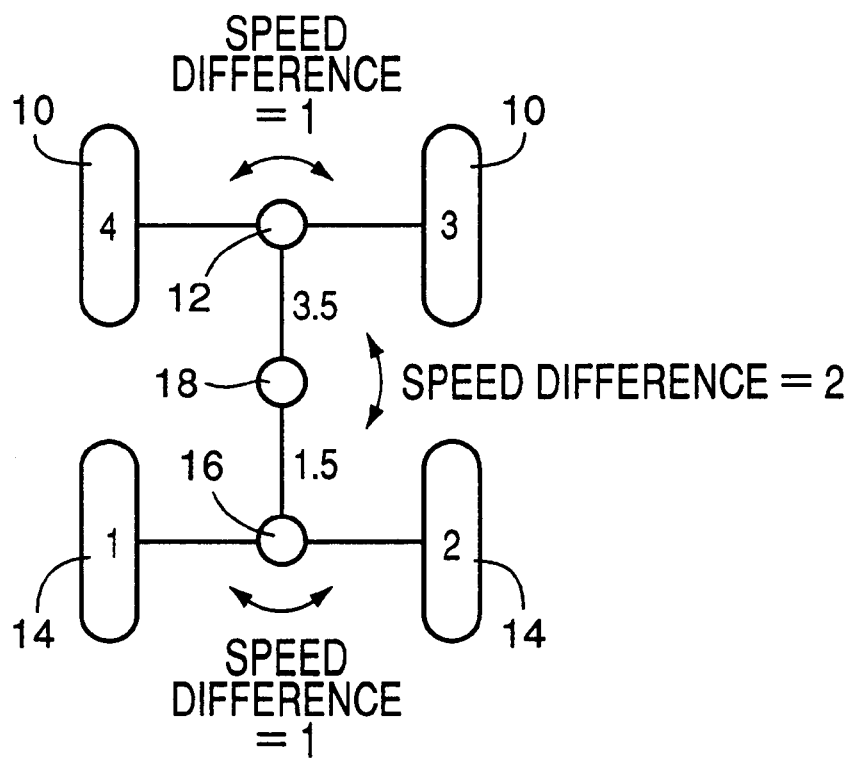
FIG. 5 is a view for explaining the wheel drive force control according to the routine of FIG. 4 in one example of a running condition of the motor vehicle.

The wheel drive force control routine of FIG. 4 will be explained with respect to a specific example of running condition of the motor vehicle as indicated in FIG. 5. In this example, the rotating speeds of the four drive wheels 10, 14 are different from each other. More specifically, the rotating speeds of the front left and right wheels 10 are indicated as "4" and "3", respectively, while the rotating speeds of the rear left and right wheels 14 are indicated as "1" and "2", respectively. Accordingly, the speed of the front output shaft 20 of the center differential 18 is "3.5", while the speed of the rear output shaft 22 of the center differential 18 is "1.5", so that the speed difference of the center differential 18 is equal to "2". The speed difference of the front differential 12 is "1", and that of the rear differential 16 is also equal to "1".

The speed difference of the center differential 18 and the speed difference of the front differential 12 can be reduced by suitably controlling the brakes 40 for the front drive wheels 10, more specifically, by suitably controlling the hydraulic pressures in the brake cylinders 56 for the front drive wheels 10, so as to change (lower) the rotating speeds of these wheels 10. The amounts of change of the speeds of the wheels 10 by operation of the brakes 40 will be referred to as "speed control amounts" of the wheels 10. The term "speed control amounts" will be also used for the rear drive wheels 14.

Figure 6:
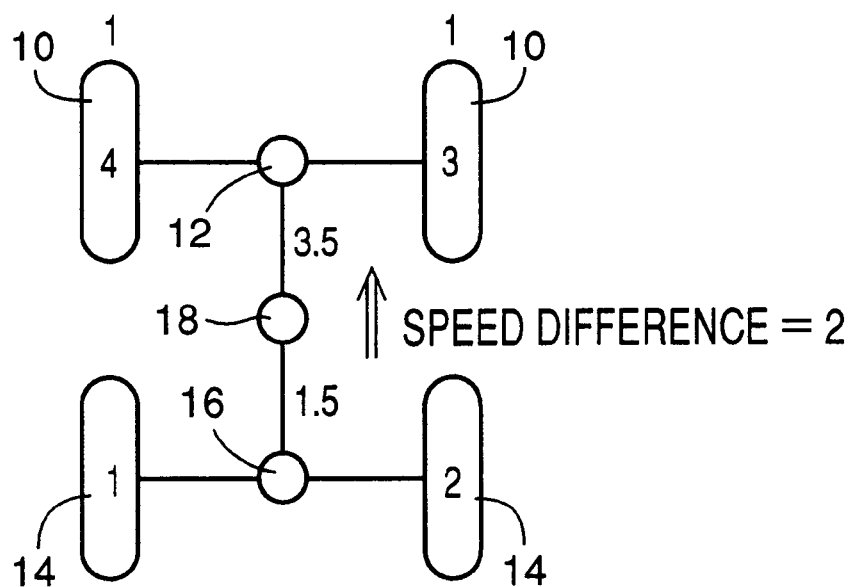
FIG. 6 is another view for explaining the wheel drive force control routine of FIG. 4.

To eliminate the speed difference "2" of the center differential 18, the speeds of the front right and left wheels 10 must be lowered by a total amount of "2". Since the front differential 12 is adapted to evenly distribute the input torque from the center differential 18 to the front right and left wheels 10, the speed of each front wheel 10 must be lowered by "1". That is, the speed control amount for each front drive wheel 10 is "1", as indicated in FIG. 6. Where the speed control amount is a positive value, the speed is lowered. Where the speed control amount is a negative value, the speed is raised. In this respect, it is noted that the speed can be lowered by brake application to the wheel, but cannot be raised by the brake application.

Figure 7:
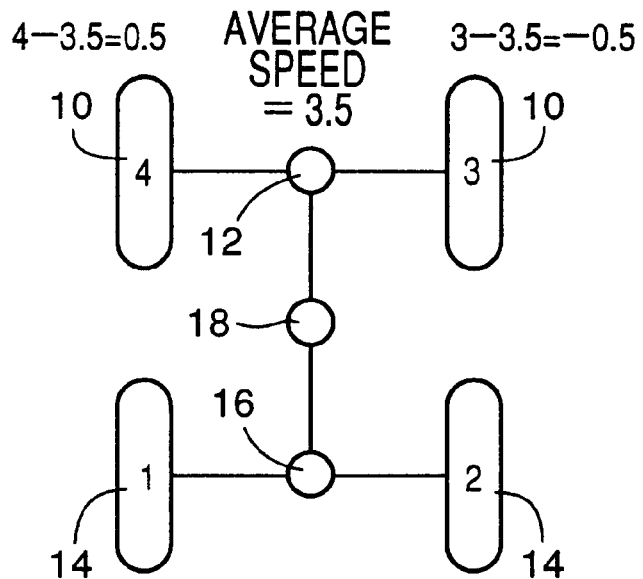
FIG. 7 is a further view for explaining the wheel drive force control routine.

To eliminate the speed difference "1" of the front differential 12, the speed control amount for the front left wheel 10 must be "+0.5" while the speed control amount for the front right wheel 10 must be "−0.5", as indicated in FIG. 7. In other words, the speed of the front left wheel 10 must be lowered by "0.5" while the speed of the front right wheel 10 must be raised by "0.5".

Figure 8:
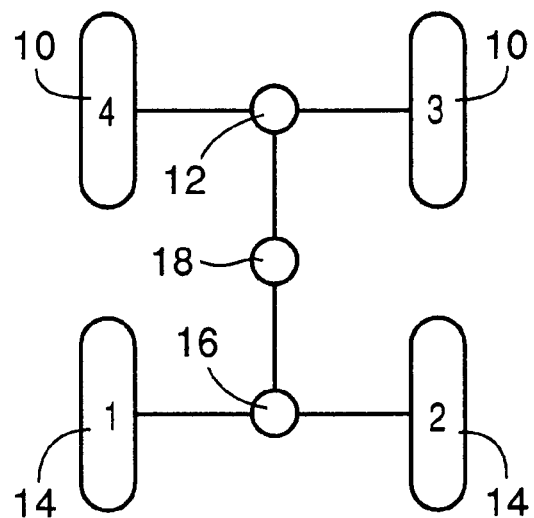
FIG. 8 is a still further view for explaining the wheel drive force control routine.
Figure 9:
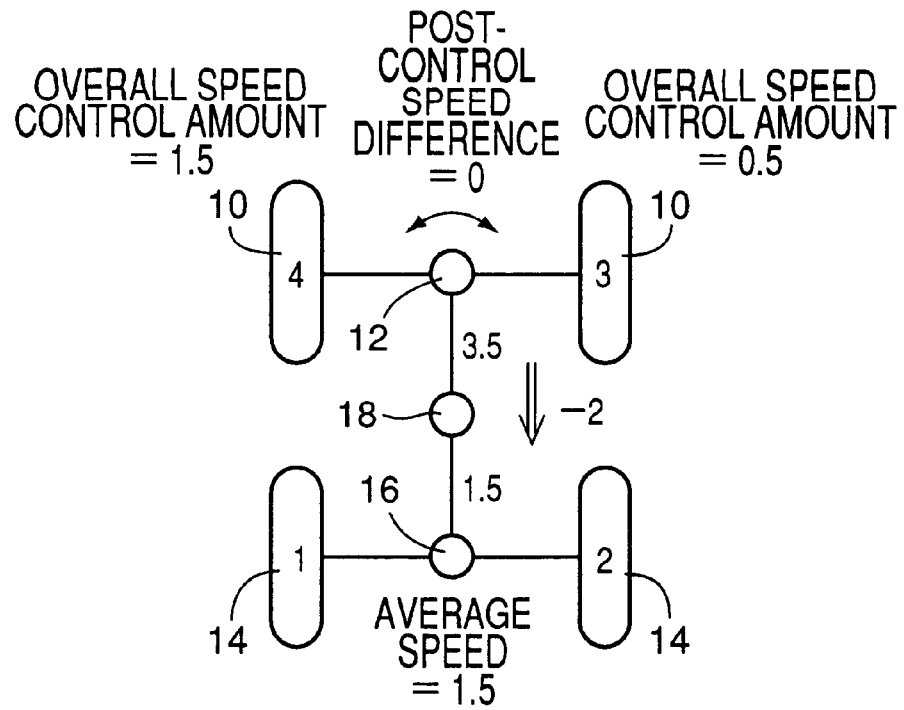
FIG. 9 is a yet further view for explaining the wheel drive force control routine.
Figure 10:
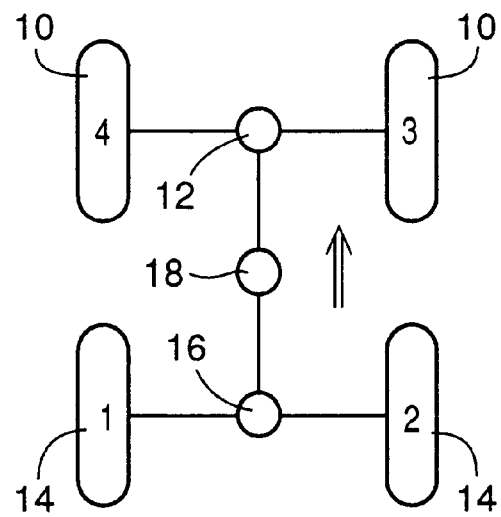
FIG. 10 is another view for explaining the wheel drive force control routine.
Figure 11:
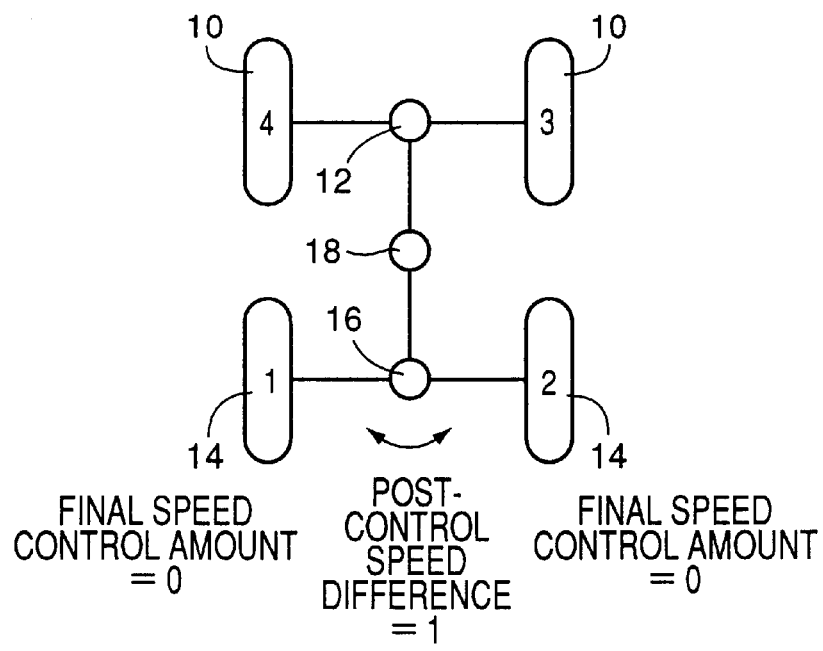
FIGS. 11 and 12 are further views for explaining the wheel drive force control routine in another example of a running condition of the motor vehicle.

Accordingly, the overall speed control amount for the front left wheel 10 is "1.5" while the overall speed control amount for the front right wheel 10 is "0.5", as indicated in FIG. 8.

Where the speed difference "2" of the center differential 18 and the speed difference "1" of the rear differential 16 are eliminated by controlling the speeds of the rear left and right wheels 14, the overall speed control amount for the rear left wheel 14 must be "−1.5"=−1−0.5, while the overall speed control amount for the rear right wheel 14 must be "−0.5"=−1+0.5, as indicated in FIGS. 9 and 10. However, the speeds of the wheels 10, 14 cannot be raised by controlling the brakes 40, as indicated above. Therefore, the final speed control amounts for the rear drive wheels 14 are both zeroed, as indicated in FIG. 11.

In the light of the above, the present embodiment is adapted to obtain a total speed control error for each of the drive wheels 10, 14. The total speed control error is a sum of a first error component and a second error component. The first error component for each front drive wheel 10 is a difference obtained by subtracting a half of the average speed of the two rear wheels 14 from a half of the average speed of the two front wheels 10. The second error component for each front drive wheel 10 is a difference obtained by subtracting the average speed $V_{FM}$ of the two front drive wheels from the speed of the front drive wheel 10 in question. The first error component for each rear drive wheel 14 is a difference obtained by subtracting a half of the average speed of the two front wheels 10 from a half of the average speed of the two rear wheels 14, while the second error component for each rear drive wheel 14 is a difference obtained by subtracting the average speed $V_{RM}$ of the two rear drive wheel 14 from the speed of the rear drive wheel 14 in question. The brake 40 for each wheel 10, 40 whose total speed error is a positive value is controlled so that the total speed error is substantially zeroed.

Figure 12:
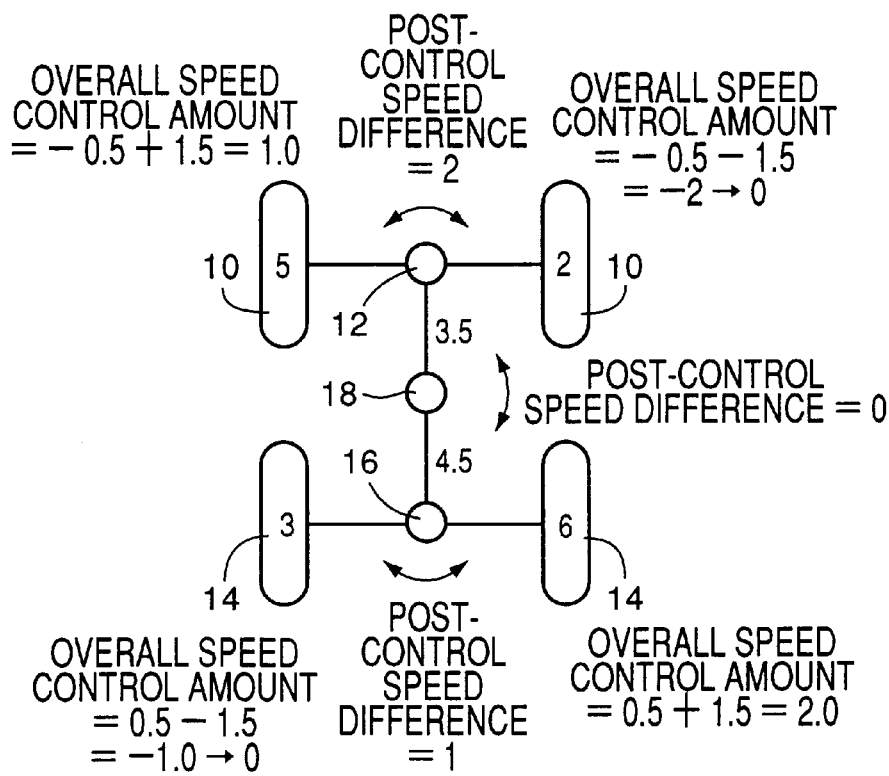

The specific example of FIGS. 5–11 provides substantially the same result as provided where the limited slip differential mechanism is provided for each of the center and front differentials 18, 12. In an example of FIG. 12, only the speed difference of the center differential 18 is zeroed, while the speed differences of the front and rear differentials 12, 16 are not zeroed. In this example of FIG. 12, the present embodiment provides substantially the same result as provided where the limited slip differential mechanism is provided for only the center differential 18. In other words, the effect provided by the wheel drive force control device adapted to control the brakes 40 for controlling the wheel drive forces according to the present embodiment is at least the same as the effect provided where the limited slip differential mechanism is provided for only the center differential 18, but is smaller than the effect provided where the limited slip differential mechanism is provided for each of the three differentials 12, 16, 18.

Referring back to the flow chart of FIG. 4, the wheel drive force control routine is executed at a predetermined cycle time while the operation of the vehicle accelerating member is detected by the accelerator sensor 82 but the operation of the brake pedal 50 is not detected by the brake pedal sensor 84, after the ignition switch of the vehicle is turned ON. The routine is initiated with step S1 to determine whether the control of the wheel drive force is permitted by the vehicle operator. If a negative decision (NO) is obtained in step S1, one cycle of execution of the routine is terminated. If the control of the wheel drive force is permitted by the operator, that is, if an affirmative decision (YES) is obtained in step S1, the control flow goes to step S2 to read in the rotating speeds $V^{**}$ ($V_{FR}$, $V_{FL}$, $V_{RR}$, $V_{RL}$) detected by the wheel speed sensors 80, and calculate the speed control amounts for the individual drive wheels 10, 14, that is, ΔVFR for the front right wheel 10, ΔVFL for the front left wheel 10, ΔVRR for the rear right wheel 14, and ΔVRL of the rear left wheel 14, as explained above, according to the following equations:

$$\Delta V_{FR}[(V_{FR}+V_{FL})-(V_{RR}+V_{RL})]/4+(V_{FR}-V_{FM})$$

$$\Delta V_{FL}[(V_{FR}+V_{FL})-(V_{RR}+V_{RL})]/4+(V_{FL}-V_{FM})$$

$$\Delta V_{RR}[(V_{RR}+V_{RL})-(V_{FR}+V_{FL})]/4+(V_{RR}-V_{RM})$$

$$\Delta V_{RL}[(V_{RR}+V_{RL})-(V_{RR}+V_{FL})]/4+(V_{RL}-V_{RM})$$

In the above equations, the term $[(V_{FR}+V_{FL})-(V_{RR}+V_{RL})]/4$ is the first error component for each front drive wheel 10, and the term $[(V_{RR}+V_{RL})-(V_{FR}+V_{FL})]/4$ is the first error component for each rear drive wheel 14. Further, the terms $(V_{FR}-V_{FM})$ and $(V_{FL}-V_{FM})$ are the second error components for the front right and left drive wheels 10, respectively, while the terms $(V_{RR}-V_{RM})$ and $(V_{RL}-V_{RM})$ are the second error components for the rear right and left drive wheels 14, respectively.

If the speed control amount of a given drive wheel 10, 14 calculated according to the appropriate equation is a positive value, this value is determined as the final speed control amount. If the calculated speed control amount is a negative value, it means that the speed of the drive wheel in question must be raised, and therefore the final speed control amount is determined to be zero.

Then, the control flow goes to step S3 in which the braking pressure to be applied to the brake cylinder 56 of the brake 44 of each drive wheel 10, 14 is determined on the basis of the final speed control amount determined for that drive wheel, and the hydraulic pressure control device 60 is controlled so that the determined braking pressure is applied to the brake cylinder 56. Thus, one cycle of execution of the wheel drive force control routine of FIG. 4 is terminated.

It will be understood from the foregoing description of the present embodiment that the hydraulic pressure control device 60 and a portion of the controller 70 assigned to execute the wheel drive force control routine of FIG. 4 cooperate to provide a brake control device including control means for controlling the brakes 40 so as to substantially zero the total speed control error for each wheel 10, 14.

Figure 13:
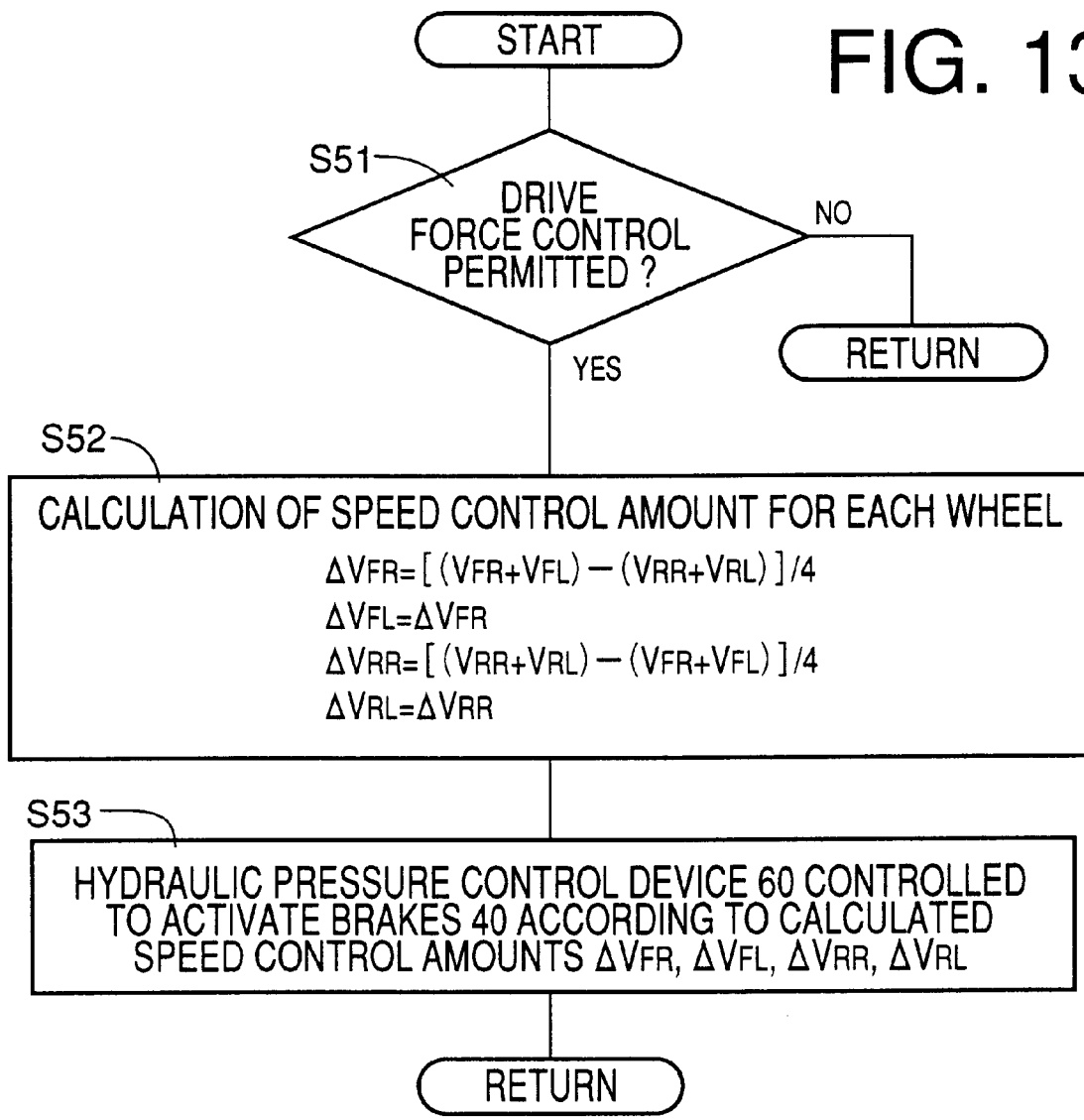
FIG. 13 is a flow chart illustrating a wheel drive force control routine executed according to a program stored in the read-only memory of a wheel drive force control apparatus constructed according to a second embodiment of the present invention.

Referring to FIG. 13, there will be described a wheel drive force control apparatus constructed according to a second embodiment of the present invention. While the first embodiment is adapted to control the rotating speeds of the drive wheels 10, 14, so as to minimize the speed differences of all of the three differentials 12, 16, 18, the present second embodiment is adapted to control the rotating speeds of the drive wheels 10, 14 so as to minimize the speed difference of only the center differential 18, according to a wheel drive force control routine illustrated in the flow chart of FIG. 13. In this case, the speed control amounts for the drive wheels 10, 14 are calculated according to the following equations, in step S52 implemented where the affirmative decision (YES) is obtained in step S51 which is identical with step S1 of FIG. 4.

$$\Delta V_{FR}=[(V_{FR}+V_{FL})-(V_{RR}+V_{RL})]/4$$

$$\Delta V_{FL}=[(V_{FR}+V_{FL})-(V_{RR}+V_{RL})]/4$$

$$\Delta V_{RR}=[(V_{RR}+V_{RL})-(V_{FR}+V_{FL})]/4$$

$$\Delta V_{RL}=[(V_{RR}+V_{RL})-(V_{FR}+V_{FL})]/4$$

Step S52 is followed by step S53 identical with step S3 of FIG. 4.

As in the first embodiment, the calculated speed control amount which is positive is determined as the final speed control amount, but the final speed control amount is zeroed if the calculated speed control amount is a negative value.

It will be understood that the hydraulic pressure control device 60 and a portion of the controller 70 assigned to implement the wheel drive force control routine of FIG. 13 cooperate to provide the brake control device including the total control means for controlling the brakes 40 so as to substantially zero the speed control error for each wheel 10, 14.

Figure 14:
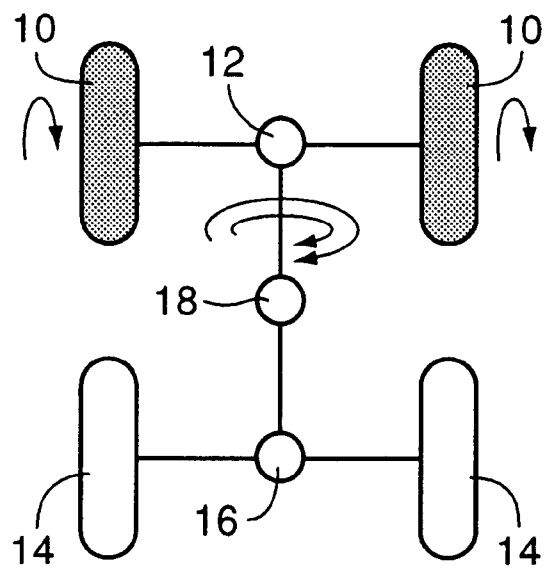
FIG. 14 is a view for explaining the relationship between the embodiments of FIGS. 1 and 13.
Figure 15:
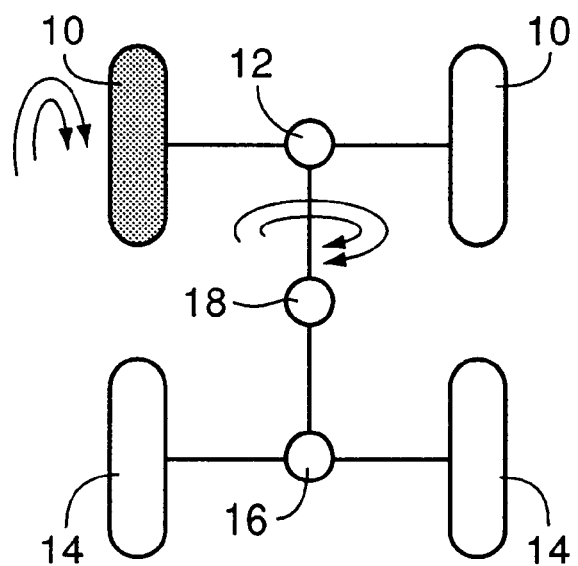
FIG. 15 is a view explaining the relationship between the embodiments of FIGS. 1 and 13.

The present second embodiment is adapted to minimize the speed difference of only the center differential 18 while the speed differences of the front and rear differentials 12, 16 are not taken into account for controlling the drive forces of the drive wheels 10, 14. This embodiment is capable of suitably dealing with the running condition of the motor vehicle in which the front right and left wheels 10 connected to each other by the front differential 12 have almost the same degrees of slipping tendency, as indicated in FIG. 14. However, the present embodiment is not capable of suitably dealing with the running condition of the motor vehicle in which the front left drive wheel 10 has a larger degree of slipping tendency than the front right drive wheel 10, as indicated in FIG. 15. In this case, the drive torque to be applied to the front right drive wheel 10 having a smaller degree of slipping tendency is undesirably reduced. In this respect, it is noted that the first embodiment assures a sufficient drive torque of the front right drive wheel 10 even in the case of FIG. 15, since the speeds of the wheels 10, 14 are controlled so as to minimize the speed differences of the front and rear differentials 12, 16 as well as the speed difference of the center differential 18.

A third embodiment of this invention will be described by reference to FIGS. 16 and 17. The same reference numerals as used in the first embodiment will be used in the third embodiment, to identify the same elements, which will be not be described redundantly.

In the first embodiment adapted to control the brakes 40 so as to substantially zero the speed difference between the center differential 18, the speed control amounts for the drive wheels 10, 14 may be extremely small, making it difficult to smoothly start the motor vehicle, in a running condition of the vehicle in which the slipping state of the front wheels 10 is substantially the same as that of the rear wheels 14.

In the light of the above running condition, the present third embodiment is adapted to control the speeds of the drive wheels 10, 14 in a suitable one of two speed control modes, namely, a first speed control mode according to a first rule used in the first embodiment to calculate the speed control amounts for the drive wheels 10, 14, and a second speed control mode according to a second rule in which the speed control amount for each drive wheel 10, 14 is calculated as a speed control error obtained by subtracting a minimum value $V_{MIN}$ of the speeds of the four drive wheels 10, 14, from the speed of each drive wheel 10, 14. The minimum-value $V_{MIN}$ is the lowest one of the speeds of the four wheels 10, 14, and is used as a reference wheel speed for controlling the brakes 40. That is, the speed control amount $\Delta V^{**}$ for each wheel 10, 14 is calculated according to the following equation:

$$\Delta V^{}=V^{}-V_{MIN}$$

The selection of one of the first and second speed control modes (first and second rules) for each drive wheel 10, 14 is effected depending upon whether the motor vehicle is in a running condition in which smooth starting of the vehicle is difficult.

The determination as to whether smooth starting of the vehicle is difficult may be effected by determining whether the speed of any one of the four wheels 10, 14 is substantially zero, that is, whether any one of the four wheels is not rotating. In the present third embodiment, however, another condition is also checked to determine the difficulty of smooth starting of the motor vehicle. That is, the third embodiment is adapted to determine that smooth starting of the vehicle is difficult if any one of the four wheels is stopped and if the speed difference of the center differential 18 is substantially zero. If these two conditions are simultaneously satisfied, it means that the control amounts for the wheels as calculated according to the first rule tend to be extremely small, making it difficult to smoothly start the vehicle. However, the second speed control mode is not selected immediately after the above two conditions are simultaneously satisfied, but is selected only after a predetermined time T has passed with the two conditions being simultaneously satisfied. This arrangement improves the adequacy of selection of the speed control mode.

The determination of the difficulty of smooth starting of the vehicle may be effected by using a third condition that the first speed control mode is currently established. In this case, the three conditions must be satisfied simultaneously for the predetermined time T, to select the second speed control mode. Alternatively, the second condition that the speed difference of the center differential 18 is substantially zero may be replaced by the above condition that the first speed control mode is currently established.

Thus, the second speed control mode in which the drive wheel speeds are controlled so as to zero the speed control error $\Delta V^{}=V^{}-VMIN$ is selected when the predetermined conditions are satisfied for the predetermined time T.

Figure 16:
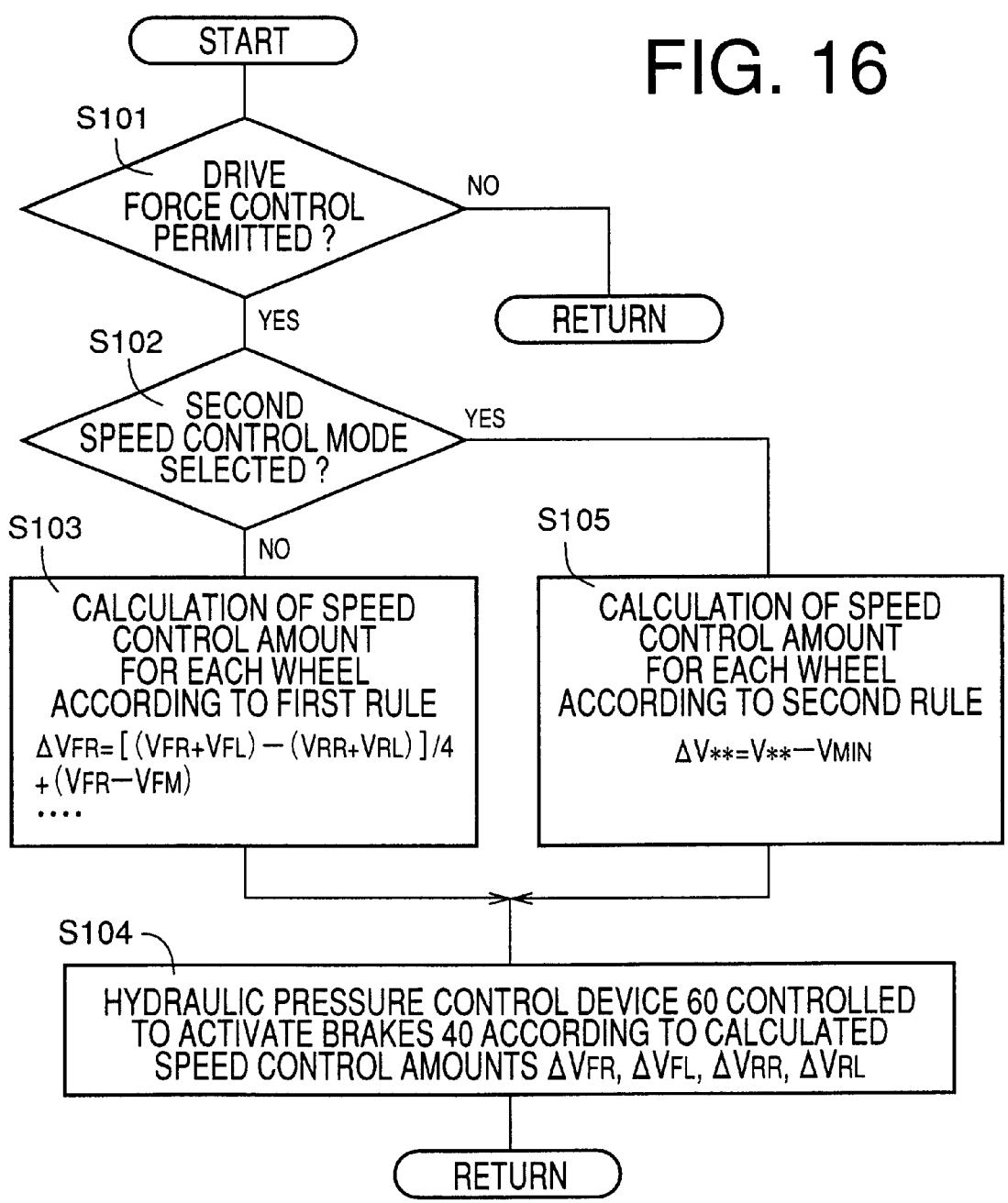
FIG. 16 is a flow chart illustrating a wheel drive force control routine executed according to a program stored in the read-only memory of a wheel drive force control apparatus constructed according to a third embodiment of this invention.

The wheel drive force control routine illustrated in the flow chart of FIG. 16 is executed according to a control program stored in the ROM 74 of the controller 70. This routine includes step S102 in which an affirmative decision (YES) is obtained if the second speed control mode has been selected according to a second speed control mode selecting routine of FIG. 17.

The wheel drive force control routine of FIG. 16 is initiated with step S101 to determine whether the control of the wheel drive forces is permitted by the vehicle operator. If the affirmative decision (YES) is obtained in step S101, the control flow goes to step S102 to determine whether the second speed control mode has been established according to the routine of FIG. 17. If a negative decision (NO) is obtained, that is, it means that the first speed control mode must be used to control the brakes 40. In this case, the control flow goes to step S103 to calculate the speed control amounts for the individual drive wheels 10, 14 according to the first rule as in step S2 of FIG. 4 of the first embodiment.

Figure 17:
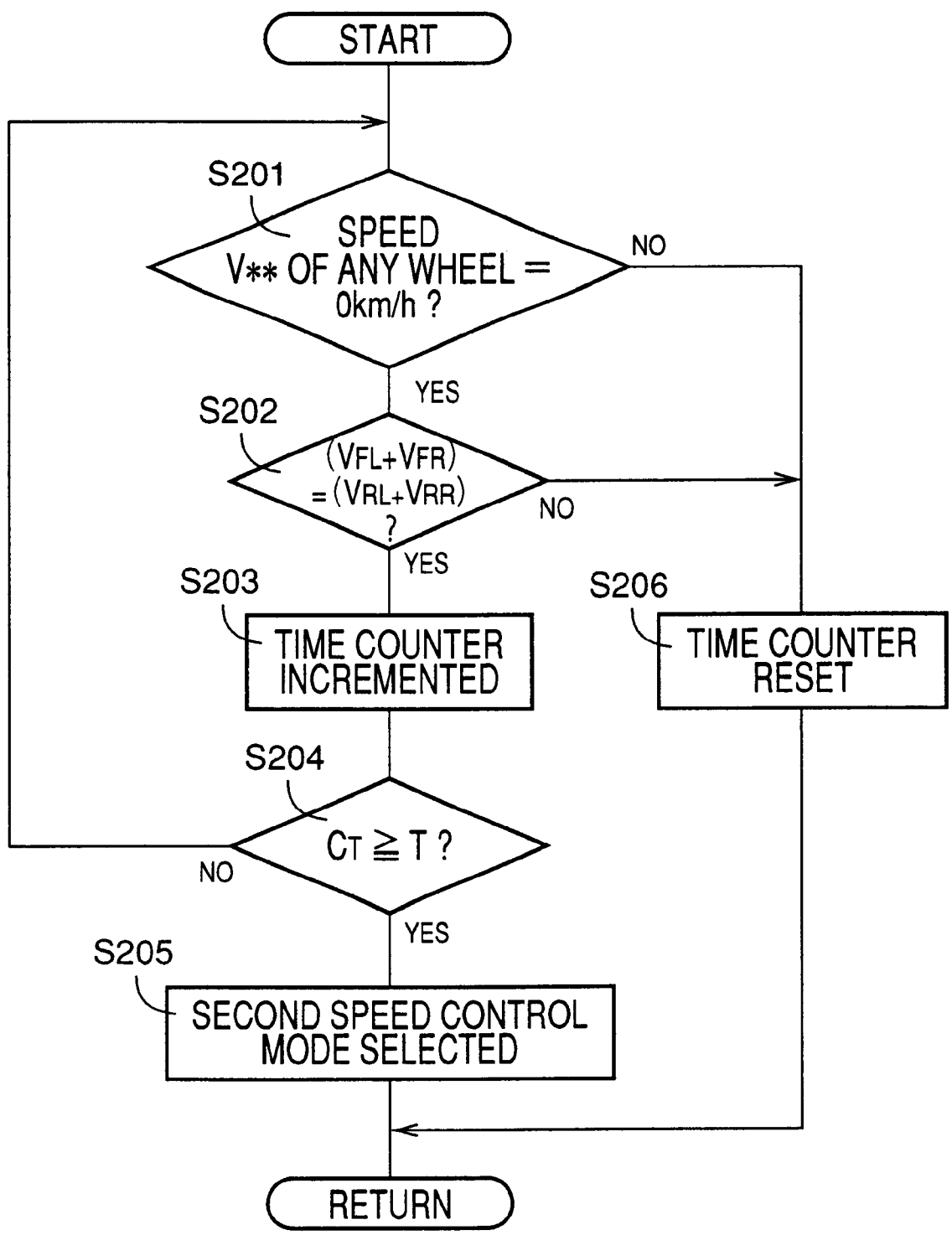
FIG. 17 is a flow chart illustrating a second speed control mode selecting routine executed in the third embodiment, to select the speed control mode used in the routine of FIG. 16.

If the second speed control mode has been established according to the second speed control mode selecting routine of FIG. 17, that is, if an affirmative decision (YES) is obtained in step S102, the control flow goes to step S105 to calculate the speed control amounts for the drive wheels 10, 14 according to the second rule, more specifically, calculate the speed control amount for each wheel by subtracting the reference wheel speed, that is, the lowest one $V_{MIN}$ of the speeds of the four wheels from the speed of that wheel.

Steps S103 and S105 are followed by step S104 identical with step S3 of FIG. 4, in which the hydraulic pressure control device 60 is controlled to control the brakes 40 for the drive wheels 10, 14 according to the calculated control amounts.

The second speed control mode selecting routine illustrated in the flow chart of FIG. 17 is initiated with step S201 to determine whether the speed $V^{}$ of any drive wheel 10, 40 is zero (0km/h), namely, whether any drive wheel is held stationary. If a negative decision (NO) is obtained in step S201, the control flow goes to step S206 to reset a time counter, which is provided in the computer 78, to measure a time during which an affirmative decision (YES) is obtained in both steps S201 and S202, as described below. In this case, one cycle of execution of the routine of FIG. 17 is terminated. Under this condition, the speed control amounts for the drive wheels 10, 14 are calculated in step S103** according to the first rule.

If the speed of any of the drive wheels 10, 14 is substantially zero, the affirmative decision (YES) is obtained in step S201, and the control flow goes to step S202 to determine whether the speed difference of the center differential 18 is substantially zero, that is, whether the sum of the speeds of the front left and right wheels 10 is substantially equal to the sum of the speeds of the rear left and right wheels 14. If a negative decision (NO) is obtained in step S202, the control flow goes to step S206 to reset the time counter as described above, and one cycle of execution of the routine is terminated.

If the speed of any wheel 10, 14 is substantially zero and if the sum of the front wheels 10 and the sum of the rear wheels 14 are substantially equal to each other, the affirmative decision (YES) is obtained in step S202, and the control flow goes to step S203 to increment the time counter. Then, the control flow goes to step S204 to determine whether a content $C_T$ of the time counter is equal to or larger than a predetermined value T, that is, determine whether the affirmative decision (YES) has been obtained in both of the steps S201 and S202 for at least the predetermined time T. If a negative decision (NO) is obtained in step S204, the control flow goes back to step S201.

When the content $C_T$ of the time counter has reached the predetermined value T during repeated implementation of steps S201–S204, an affirmative decision (YES) is obtained in step S204, and the control flow goes to step S205 to select the second speed control mode. Thus, one cycle of execution of the routine of FIG. 17 is terminated.

It will be understood from the above description of the third embodiment that the hydraulic pressure control device 60 and a portion of the controller 70 assigned to implement step S103 cooperate to provide control means for controlling the brakes 40 so as to substantially zero the speed control error for each wheel 10, 14. It will also be understood that the hydraulic pressure control device 60 and a portion of the controller 70 assigned to implement step S105 cooperate to provide control means for controlling the brakes 40 so as to substantially zero the speed difference of the non-stopped wheels 10, 14 from the speed (lowest speed $V_{MIN}$) of the stopped wheel 10, 14 (reference wheel speed $V_{MIN}$). It will also be understood that the hydraulic pressure control device 60 and a portion of the controller 70 assigned to implement steps S101 and S103–S105 cooperate to provide at least two control means for controlling the brakes 40 in a selected one of a plurality of speed control modes. It will further be understood that the wheel speed sensors 80 and a portion of the controller 70 assigned to implement the second speed control mode selecting routine of FIG. 17 cooperate to provide selectively enabling means for selectively enabling one of the above-indicated at least two control means to operate.

Figure 18:
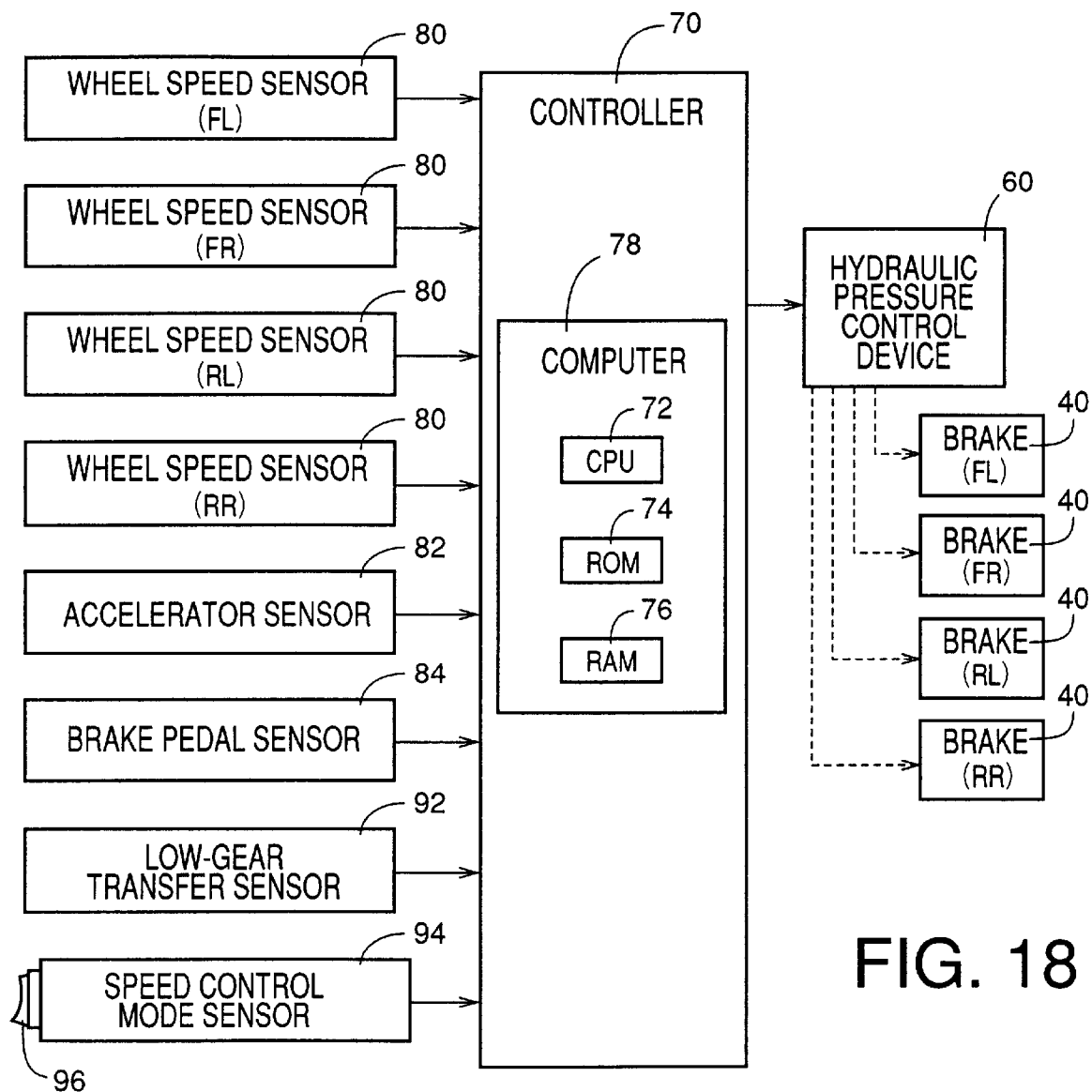
FIG. 18 is a block diagram illustrating an electrical arrangement of a wheel drive force control apparatus constructed according to a fourth embodiment of this invention.

Referring next to FIGS. 18 and 19, a fourth embodiment of this invention will be described. The same reference numerals as used in the first embodiment will be used in the fourth embodiment, to identify the same elements, which will not be described redundantly.

Reference is made to the block diagram of FIG. 18, there is shown an electrical arrangement of the wheel drive force control apparatus, including the controller 70 which is adapted to receive output signals of a LOW-GEAR TRANSFER sensor 92 and a SPEED CONTROL MODE sensor 94. The LOW-GEAR TRANSFER sensor 92 is connected to the operator-controlled transfer switching member 30, to detect that the switching member 30 is placed in its position for placing the transfer 28 in a LOW-GEAR transfer state. The SPEED CONTROL MODE sensor 94 is connected to an operator-controlled SPEED CONTROL MODE selector switch 96 which is provided in the driver's compartment of the motor vehicle and has a FIRST SPEED CONTROL mode position and a SECOND SPEED CONTROL mode position for selecting the respective first and second speed control modes in which the speed control amounts for the drive wheels 10, 14 are calculated according to the respective first and second rules described above. The SPEED CONTROL MODE sensor 94 is adapted to detect that the selector switch 96 is placed in the SECOND SPEED CONTROL MODE position.

The ROM 74 of the controller 70 stores a control program for executing a wheel drive force control routine illustrated in the flow chart of FIG. 19. This routine is initiated with step S301 to determine whether the control of the wheel drive forces is permitted by the vehicle operator. If the affirmative decision (YES) is obtained in step S301, the control flow goes to step S302 to determine whether the transfer 28 is placed in the LOW-GEAR transfer state. The determination in this step S302 is effected based on the output signal of the LOW-GEAR TRANSFER sensor 92. If an affirmative decision (YES) is obtained in step S302, the control flow goes to step S306. If a negative decision (NO) is obtained in step S302, the control flow goes to step S303 to determine whether the SPEED CONTROL MODE selector switch 96 is placed in the SECOND SPEED CONTROL MODE position. The determination in step S303 is effected based on the output signal of the SPEED CONTROL MODE sensor 94. If a negative decision (NO) is obtained in step S303, the control flow goes to step S304 to calculate the speed control amounts for the drive wheels 10, 14 according to the first rule described above with respect to step S2. If an affirmative decision (YES) is obtained in step S303, the control flow goes to step S306, as in the case where the affirmative decision is obtained in step S302. Step S306 is provided to calculate the speed control amounts for the drive wheels 10, 14 according to the second rule described above with respect to step S105. Steps S304 and S306 are followed by step S305 identical with steps S3, S53 and S104, wherein the hydraulic pressure control device 60 is controlled according to the calculated speed control amounts, to control the brakes 40. Thus, one cycle of execution of the routine of FIG. 19 is terminated.

It will be understood from the above description of the fourth embodiment that the hydraulic pressure control device 60 and a portion of the controller 70 assigned to implement step S304 of FIG. 19 cooperate to provide control means for controlling the brakes 40 so as to substantially zero the speed control error for each wheel 10, 14. It will also be understood that the hydraulic pressure control device 60 and a portion of the controller 70 assigned to implement step S306 of FIG. 19 cooperate to provide control means for controlling the brakes 40 so as to substantially zero the speed difference of the non-stopped wheels 10, 14 from the speed (lowest speed or reference speed $V_{MIN}$) of the stopped wheel 10, 14. It will also be understood that the hydraulic pressure control device 60 and a portion of the controller 70 assigned to implement steps S101 and S304–S306 cooperate to provide at least two control means for controlling the brakes 40 in a selected one of a plurality of speed control modes. It will further be understood that the LOW-GEAR TRANSFER sensor 92, SPEED CONTROL MODE sensor 94 and a portion of the controller 70 assigned to implement steps S302 and S303 of FIG. 19 cooperate to provide selectively enabling means for selectively enabling one of the above-indicated at least two control means to operate.

While the illustrated embodiments are adapted to control the drive forces of the drive wheels 10, 14 by controlling the brakes 40, the wheel drive forces may be controlled by controlling the engine 24 so as to control the output torque of the engine 24, as well as the brakes 40, so as to permit smooth starting of the vehicle. In this case, the control of the engine 24 may be initiated simultaneously with the control of the brakes 40, or after the initiation of the control of the brakes 40 in the case where the vehicle cannot be smoothly started by controlling only the brakes 40.

While the several presently preferred embodiments of the present invention have been described above in detail by reference to the accompanying drawings, it is to be understood that the present invention may be embodied with various changes, modifications and improvements, which may occur to those skilled in the art, without departing from the spirit and scope of the invention defined in the following claims.

What is claimed is:

1. An apparatus for controlling an actual value of a drive force produced between a road surface and each of four drive wheels consisting of a front right drive wheel, a front left drive wheel, a rear right drive wheel and a rear left drive wheel of a four-wheel drive motor vehicle including (a) a drive power source for driving said four drive wheels, (b) a front differential connecting said front right and left drive wheels so as to permit a difference between rotating speeds of said front right and left drive wheels, (c) a rear differential connecting said rear right and left drive wheels so as to permit a difference between rotating speeds of said rear right and left drive wheels, (d) a center differential connecting input shafts of said front and rear differentials so as to permit a difference between rotating speeds of said input shafts, and (e) four brakes for braking said four drive wheels, respectively, independently of each other, said center differential distributing a driving torque of said drive power source to said input shafts of said front and rear differentials, said front differential evenly distributing a torque received by the input shaft thereof to said front right and left drive wheels, for thereby producing the drive force between said road surface and each of said front right and left drive wheels, said rear differential evenly distributing a torque received by the input shaft thereof to said rear right and left drive wheels, for thereby producing the drive force between said road surface and each of said rear right and left drive wheels, said apparatus comprising:

four wheel speed sensors for detecting the rotating speeds of said four drive wheels, respectively; and a brake control device responsive to output signals of said four wheel speed sensors, and operable when said four drive wheels have a first and a second drive wheel having different critical values of the drive force with respect to said road surface, the critical value of the drive force of said first drive wheel being smaller than that of said second drive wheel, said brake control device activating one of said four brakes which corresponds to said first drive wheel, to thereby apply a braking torque to said first drive wheel for increasing an apparent value of said drive force of said first drive wheel, in order to increase the actual value of the drive force of said second drive wheel, wherein said brake control device includes first control means for calculating a total speed control error for each of said front right and left drive wheels, and a total speed control error for each of said rear right and left drive wheels, said total speed control error for said each front drive wheel comprising a first error component which is a difference obtained by subtracting a half of an average speed of said rear right and left drive wheels from a half of an average speed of said front right and left drive wheels, and a second error component which is a difference obtained by subtracting said average speed of said front right and left drive wheels from the speed of said each front drive wheel, said total speed control error for said each rear drive wheel comprising a first error component which is a difference obtained by subtracting a half of an average speed of said front right and left drive wheels from a half of an average speed of said rear right and left drive wheels, and a second error component which is a difference obtained by subtracting said average speed of said rear right and left drive wheels from the speed of said each rear drive wheel, said first control means controlling each of said four brakes which corresponds to each of said four drive wheels whose total speed control error is a positive value, such that said positive total speed control error of said each drive wheel is substantially zeroed.

2. An apparatus according to claim 1, wherein said brake control device further comprises second control means operable when said four drive wheels include s a lowest-speed drive wheel whose rotating speed is the lowest of all of said four drive wheels, said second control means controlling three brakes of said four brakes which three brakes correspond to respective three drive wheels that are said four drive wheels except said lowest-speed drive wheel, said second control means controlling said three brakes, by using the lowest rotating speed of said lowest-speed drive wheel as a reference wheel speed, so as to substantially zero a difference of the rotating speed of each of said three drive wheels from said reference wheel speed.

3. An apparatus according to claim 1, wherein said brake control device further comprises second control means for controlling two brakes of said four brakes which correspond to one of a first pair of wheels, consisting of said front right and left wheels and a second pair of wheels consisting of said rear right and left drive wheels, said one of said first and second pairs having a higher average speed than the other of said first and second pairs, said second control means controlling said two brakes, such that the average speed of said one of said first and second pairs is reduced toward the average speed of said other of said first and second pairs.

4. An apparatus according to claim 1, wherein said brake control device further includes one additional control means selected from the group consisting of second control means and third control means, said second control means being operable when said four drive wheels include a lowest-speed drive wheel whose rotating speed is the lowest of all of said four drive wheels, said second control means controlling three brakes of said four brakes which three brakes correspond to respective three drive wheels that are said four drive wheels except said lowest-speed drive wheel, said second control means controlling said three brakes, by using the lowest rotating speed of said lowest-speed drive wheel as a reference wheel speed, so as to substantially zero a difference of the rotating speed of each of said three drive wheels from said reference wheel speed, said third control means controlling two brakes of said four brakes which correspond to one of a first pair of wheels consisting of said front right and left drive wheels and a second pair of wheels consisting of said rear right and left drive wheels, said one of said first and second pairs having a higher average speed that the other of said first and second pairs, said third control means controlling said two brakes, such that the average speed of said one of said first and second pairs is reduced toward the average speed of said other of said first and second pairs, said brake control device further including selectively enabling means for selectively enabling said one additional control means to operate.

5. An apparatus according to claim 4, wherein said selectively enabling means includes determining means for determining whether the motor vehicle is placed in a condition in which starting of the motor vehicle is difficult, said selectively enabling means further including selecting means for selecting said second control means if said determining means determines that the motor vehicle is placed in said condition, and selecting said third control means if said determining means determines that the motor vehicle is not placed in said condition.

6. An apparatus according to claim 5, wherein said selectively enabling means includes means for determining whether the rotating speed of any one of said four drive wheels is substantially zero.

7. An apparatus according to claim 6, wherein said determining means includes means for determining whether an average rotating speed of said front right and left drive wheels is substantially equal to an average rotating speed of said rear right and left drive wheels, said determining means determines that the motor vehicle is placed in said condition if the rotating speed of any one of said four drive wheels is substantially zero and if said average rotating speeds of said front right and left drive wheels and said rear right and left drive wheels are substantially equal to each other.

8. An apparatus according to claim 4, wherein said selectively enabling means includes determining means for determining whether any one of at least one operator-controlled member is placed in a position for selecting said second control means, and means for enabling said second control means to operate if said determining means determines that any one of said at least one operator-controlled member is placed in said position.

9. An apparatus for controlling an actual value of a drive force produced between a road surface and each of four drive wheels consisting of a front right drive wheel, a front left drive wheel, a rear right drive wheel and a rear left drive wheel of a four-wheel drive motor vehicle including (a) a drive power source for driving said four drive wheels, (b) a front differential connecting said front right and left drive wheels so as to permit a difference between rotating speeds of said front right and left drive wheels, (c) a rear differential connecting said rear right and left drive wheels so as to permit a difference between rotating speeds of said rear right and left drive wheels, (d) a center differential connecting input shafts of said front and rear differentials so as to permit a difference between rotating speeds of said input shafts, and (e) four brakes for braking said four drive wheels, respectively, independently of each other, said center differential distributing a driving torque of said drive power source to said input shafts of said front and rear differentials, said front differential evenly distributing a torque received by the input shaft thereof to said front right and left drive wheels, for thereby producing the drive force between said road surface and each of said front right and left drive wheels, said rear differential evenly distributing a torque received by the input shaft thereof to said rear right and left drive wheels, for thereby producing the drive force between said road surface and each of said rear right and left drive wheels, said apparatus comprising:

four wheel speed sensors for detecting the rotating speeds of said four drive wheels, respectively; and a brake control device responsive to output signals of said four wheel speed sensors, and operable when said four drive wheels have a first and a second drive wheel having different critical values of the drive force with respect to said road surface, the critical value of the drive force of said first drive wheel being smaller than that of said second drive wheel, said brake control device activating one of said four brakes which corresponds to said first drive wheel, to thereby apply to said first drive wheel a braking torque whose amount is determined such that said amount is changed substantially continuously in a direct relationship to a change in a difference between rotating speeds of said first and second wheels detected by corresponding ones of said four wheel speed sensors, for increasing an apparent value of said drive force of said first drive wheel, in order to increase the actual value of said drive force of said second drive wheel.

* * * * *